(12) United States Patent
Niwamoto

(10) Patent No.: US 6,628,718 B1
(45) Date of Patent: Sep. 30, 2003

(54) COLOR SOLID-STATE IMAGE-PICKUP CAMERA SYSTEM

(75) Inventor: Hiroaki Niwamoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/186,879

(22) Filed: Nov. 6, 1998

(30) Foreign Application Priority Data

Nov. 7, 1997 (JP) .............................................. 9-306161

(51) Int. Cl.$^7$ ................................................. H04N 7/18
(52) U.S. Cl. .............................. 375/240.23; 375/240.22
(58) Field of Search ....................... 375/240.22, 240.23; 348/272, 414, 417, 422; 382/253, 233, 240, 239

(56) References Cited

U.S. PATENT DOCUMENTS 5,822,465 A * 10/1998 Normile et al. ............. 382/253
5,859,932 A *  1/1999 Etoh ........................... 382/253
6,404,923 B1 *  6/2002 Chaddha ..................... 382/224

FOREIGN PATENT DOCUMENTS

JP    7184127    7/1995
JP    9037202    2/1997

OTHER PUBLICATIONS

Chapter 6 Ideas on Vector Quantization, (Image Information Compression, edited by the Television Society, Ohm Publishing Co., Ltd. 1991, pp. 115–139).

Shoji Kawahito et al., Journal of Image–Information Media Society, vol. 52, No. 2, pp. 206–213 (1998).

* cited by examiner

Primary Examiner—Andy Rao
(74) Attorney, Agent, or Firm—Birch, Stewart, Kolasch & Birch, LLP.

(57) ABSTRACT

A color solid-state image-pickup camera system is provided with a color solid-state image-pickup unit for acquiring image information by picking up an image of a subject, a vector quantization section, a first code-book storage section that stores code-book vectors for compressing image information, a vector decoding section and a second storage section that stores a plurality of kinds of code-book vectors for decompressing the image information. The vector quantization section outputs information for identifying code-book vectors that correspond to the respective blocks of the image information that has been acquired to the vector decoding section. Based upon the information, the vector decoding section selects code-book vectors that represent the luminance signal and color-difference signals, and reconstructs the respective blocks. Therefore, it is possible to carry out a color-separation process on image information by merely conducting decompression by the vector quantization method in the vector decoding section, and consequently to eliminate the necessity of providing a specific circuit for a color-separation process. This makes it possible to minimize the circuit scale and reduce the manufacturing costs.

10 Claims, 9 Drawing Sheets

FIG.9

| Ma | G | Ma | G | Ma | G | Ma | G |
|----|----|----|----|----|----|----|----|
| Cy | Ye | Cy | Ye | Cy | Ye | Cy | Ye |
| Ma | G | Ma | G | Ma | G | Ma | G |
| Ye | Cy | Ye | Cy | Ye | Cy | Ye | Cy |
| Ma | G | Ma | G | Ma | G | Ma | G |
| Cy | Ye | Cy | Ye | Cy | Ye | Cy | Ye |
| Ma | G | Ma | G | Ma | G | Ma | G |
| Ye | Cy | Ye | Cy | Ye | Cy | Ye | Cy |

| W | Ye | G | Cy |
|---|----|---|----|
| G | Cy | W | Ye |
| W | Ye | G | Cy |
| G | Cy | W | Ye |

COLOR SOLID-STATE IMAGE-PICKUP CAMERA SYSTEM

FIELD OF THE INVENTION

The present invention relates to a color solid-state image-pickup camera system which picks up an image of a subject and carries out compression and decompression processes on image information that has acquired by the image pickup.

BACKGROUND OF THE INVENTION

Conventionally, color solid-state image-pickup cameras (hereinafter, referred to as CCD cameras), which are capable of providing an image that has been picked up as a digital-image compression signal, have been well known. For example, such a color CCD camera system is disclosed in Japanese Laid-Open Patent Publication No. 184127/1995 (Tokukaihei 7-184127).

FIG. 7 is an explanatory drawing which shows the outline of the construction of this color CCD camera and its signal processing. As illustrated in FIG. 7, the conventional color CCD camera is provided with a color CCD unit 51, a color-separation processing section 53 and code processing section 55.

In this color CCD camera, image information of a subject is converted into an electric signal by the color CCD unit 51. Then an output from each pixel of the color CCD unit 51 is outputted as an output signal S52 which is a time-sequential electric signal. The output signal S52 is subject to a color-separation process at the color-separation processing section 53, and thus converted into an output signal S54 containing a luminance signal and a color-difference signal. Thus, the color-separation process refers to a process for converting an image information signal into a luminance signal and a color-difference signal.

Thereafter, the output signal S54 containing the luminance signal and color-difference signal is compressed in the code processing section 55, and outputted as a compression signal S56. This compression makes it possible to transmit and receive the image information even by the use of transfer paths having limited transfer capacities. Thus, the image information can be utilized in, for example, TV conferences and other occasions.

Moreover, Japanese Laid-Open Patent Publication No. 37202/1997 (Tokukaihei 9-37202) discloses another camera system which differs from the above-mentioned technique of the Laid-Open Patent Publication in the sequence of the color-separation and compression processes (a system consisting of a digital camera and a reproducing device) FIG. 8 is an explanatory drawing that shows the outline of the construction of the camera system and its signal processing in this Laid-Open Patent Publication. As illustrated in FIG. 8, this system is provided with a CCD unit 51 and a code processing section 61 which constitute a digital camera, and a decode processing section 63, a color-separation processing section 65 and a color monitor 67 which constitute a reproducing device.

Here, image information, which has been converted into the signal S52 in the CCD unit 51, is compressed in the code processing section 61 into a compression signal S62 prior to being subject to a color-separation process. Then the compression signal S62 is decompressed in the decode processing section 63, and the resulting signal is outputted to the color-separation processing section 65 as an output signal S64. Successively, the output signal S64 is subject to a color-separation process in the color-separation processing section 65, and the resulting signal is outputted to the color monitor 67 as a signal S66 containing a luminance signal and a color-difference signal. Since this prior-art technique does not carry out a color-separation process in any of the color CCD unit 51 and the code processing section 61 which constitute a digital camera (compression apparatus), it becomes possible to miniaturize the circuit scale of the digital camera.

Referring to the color CCD camera of FIG. 7 as an example, an explanation will be given of a color-separation process commonly used in a color CCD camera.

FIG. 9 is an explanatory drawing that shows a complementary-color filter 71 that is installed in the color CCD unit 51. As illustrated in FIG. 9, the complementary-color filter 71 is designed so that filters Ma (magenta), Ye (yellow), Cy (cyan) and G (green) of respective colors are arranged in a predetermined array; and is placed in front of the color CCD unit 51 so that light from a subject is made incident on the color CCD unit 51 through the complementary-color filter 71.

Additionally, for example, as shown in FIG. 11, the color CCD unit 51 may be provided with a complementary-color filter 72 in which filters W (white), Ye (yellow), Cy (cyan) and G (green) of respective colors are arranged in a predetermined array.

The color CCD unit 51, which receives light from a subject through complementary-color filter 71 or complementary-color filter 72, and outputs a signal S52 that corresponds to the amount of light receipt, is provided with a plurality of light-receiving elements (pixels) that are associated with the respective filters of the complementary-color filter 71 or 72. The output of each of the light-receiving elements is inputted to the color-separation processing section 53 as image data. Here, the readout system of image data related to the pixels in the color CCD unit 51 is determined by the complementary filter used therein.

The color-separation processing section 53 generates a luminance signal Y and color-difference signals U and V based upon the signal S52 that has been outputted from the color CCD unit 51. Here, the principle of generation of the luminance signal Y and color-difference signals U and V will be described later. These luminance signal Y and the color-difference signals U and V are inputted to the code processing section 55.

FIG. 10 schematically shows a light-receiving surface of the color CCD unit 51; and Ma, Cy, Ye and G in this Figure respectively indicate pixels that receive light rays that have passed through the respective color filters Ma, Cy, Ye and G in the complementary-color filter 71. In this case, assuming that pixel Ma, located on the upper left t corner in the Figure, has coordinates (0, 0), the coordinates of pixel X located at a position apart from pixel Ma by p in the vertical direction and q in the horizontal direction is defined as (p, q); thus, the output of pixel X is represented by $X_{pq}$ using matrix representation. Moreover, it is assumed, hereinafter, that the generation of the luminance signal Y and the color-difference signals U and V are carried out on a basis of pixel blocks including 8 longitudinal pixels and 8 lateral pixels in the color CCD unit 51.

Moreover, the luminance signal Y and the color-difference signals U and V are obtained based upon outputs from 4 adjacent pixels. Here, it is assumed that the luminance signal Y and the color-difference signals U and V are outputted from corresponding lattice points of the 4 pixels. For convenience of explanation, assuming that, among the lattice points shown in FIG. 10, the uppermost left lattice point (a point surrounded by pixels (p, q)=(0, 0), (1, 0), (1, 1) and (0, 1)) has coordinates (0, 0), the coordinates of a lattice point located at a position apart from said lattice point by i in the vertical direction and j in the horizontal direction is defined as (i, j); thus, the outputs of the luminance signal Y and the color-difference signals U and V, outputted from the lattice point in this position, are represented by luminance signal $Y_{ij}$ and color-difference signals $U_{ij}$ and $V_{ij}$, using matrix representation.

In the case when complementary filter 71 shown in FIG. 9 is used as the complementary filter, the pixel data of the color CCD unit 51 is read out by means of the 2-line-addition readout system. Therefore, as shown in FIG. 10, lattice points in the vertical direction exist on every other lines. In contrast, in the case when complementary filter 72 shown in FIG. 11 is used as the complementary filter, the pixel data of the color CCD unit 51 is read out by means of the all-pixel independent readout system; therefore, different from the case using complementary filter 71 of FIG. 9, lattice points in the vertical direction exist on every line as shown in FIG. 12.

In the above-mentioned arrangement, when light from a subject passes through a predetermined color filter in the complementary-color filter and is made incident on the color CCD unit 51, a light-receiving element in the color CCD unit 51 that has received the light outputs an electric signal corresponding to the received luminous energy to the color-separation processing section 53. Then, the color-separation processing section 53 generates a luminance signal Y and color-difference signals U and V based upon the following principle:

In the case when the complementary-color filter 71 as shown in FIG. 9 is used, the respective signals of Ma, Cy, Ye and G are represented by equation 1 using signals R, G and B.

$$\begin{cases} Ma = R + B \\ Ye = R + G \\ Cy = G + B \\ G = G \end{cases} \quad \text{(EQUATION 1)}$$

Moreover, the luminance signal Y and color-difference signals $C^1$ and $C^2$ are represented by equation 2 using the respective signals Ma, Cy, Ye and G.

$$\begin{cases} 7Y = Ma + Ye + Cy + G \\ C^1 = Ma + Ye - Cy - G \\ C^2 = Ma - Ye + Cy - G \end{cases} \quad \text{(EQUATION 2)}$$

Here, substitution of equation 1 into the respective terms on the right side of equation 2 yields equation 3.

$$\begin{cases} 7Y = 2R + 3G + 2B \\ C^1 = 2R - G \\ C^2 = 2B - G \end{cases} \quad \text{(EQUATION 3)}$$

From equation 3, G signal is represented by equation 4 using luminance signal Y and color-difference signals $C^1$ and $C^2$:

$$G = (7Y - C^1 - C^2)/5 \quad \text{(EQUATION 4)}$$

Color-difference signals U and V are represented by the following equation 5 using the luminance signal Y.

$$\begin{cases} U = R - Y \\ V = B - Y \end{cases} \quad \text{(EQUATION 5)}$$

Therefore, equation 6 is obtained from equation 3 and equation 5.

$$\begin{cases} U = (C^1 + G)/2 - Y \\ V = (C^2 + G)/2 - Y \end{cases} \quad \text{(EQUATION 6)}$$

Then, substitution of equation 4 into equation 6 yield the following equation 7.

$$\begin{cases} U = (1/10 - 1/7) \cdot 7Y + \\ \quad (1/2 - 1/10) \cdot C^1 - (1/10) \cdot C^2 \\ V = (1/10 - 1/7) \cdot 7Y - \\ \quad (1/10) \cdot C^1 + (1/2 - 1/10) \cdot C^2 \end{cases} \quad \text{(EQUATION 7)}$$

Finally, equation 8 is obtained from equation 2 and equation 7.

$$\begin{cases} Y = (Ma + Ye + Cy + G)/7 \\ U = (1/10 - 1/7) \cdot (Ma + Ye + Cy + G) + \\ \quad (4/10) \cdot (Ma + Ye - Cy - G) - \\ \quad (1/10) \cdot (Ma - Ye + Cy - G) \\ V = (1/10 - 1/7) \cdot (Ma + Ye + Cy + G) - \\ \quad (1/10) \cdot (Ma + Ye - Cy - G) + \\ \quad (4/10) \cdot (Ma - Ye + Cy - G) \end{cases} \quad \text{(EQUATION 8)}$$

Therefore, luminance signal $Y_{01}$, color-difference signals $U_{01}$ and $V_{01}$ are represented by equation 9.

$$\begin{cases} Y_{01} = (Ma_{02} + Ye_{11} + Cy_{12} + G_{01})/7 \\ U_{01} = (1/10 - 1/7) \cdot (Ma_{02} + Ye_{11} + \\ \quad Cy_{12} + G_{01}) + \\ \quad (4/10) \cdot (Ma_{22} + Ye_{32} - Cy_{31} - G_{21}) - \\ \quad (1/10) \cdot (Ma_{02} - Ye_{11} + Cy_{12} - G_{01}) \\ V_{01} = (1/10 - 1/7) \cdot (Ma_{02} + Ye_{11} + \\ \quad Cy_{12} + G_{01}) - \\ \quad (1/10) \cdot (Ma_{22} + Ye_{32} - Cy_{31} - G_{21}) + \\ \quad (4/10) \cdot (Ma_{02} - Ye_{11} + Cy_{12} - G_{01}) \end{cases} \quad \text{(EQUATION 9)}$$

As a result, luminance signal $Y_{01}$, color-difference signals $U_{01}$ and $V_{01}$, which are outputs from respective lattice points, have linear relationships with respect to outputs from pixels Ma, Cy, Ye and G as shown by equation 9. Therefore, determinant $Y_{ij}$ representing the luminance signal and determinants $U_{ij}$ and $V_{ij}$ representing the color signals are represented by equation 10 using, for example, determinants $EY_{ijpq}$, $EU_{ijpq}$, $EV_{ijpq}$ and $X_{pq}$. Here, each of i, j, p and q is any of integral numbers in the range of i=0 to 7, j=0 to 7, p=0 to 8 and q=0 to 8.

$$\begin{cases} Y_{ij} = \sum_{p,q} E^Y ijpq \cdot Xpq \\ U_{ij} = \sum_{p,q} E^U ijpq \cdot Xpq \\ V_{ij} = \sum_{p,q} E^V ijpq \cdot Xpq \end{cases} \quad \text{(EQUATION 10)}$$

On the other hand, in the case of complementary-color filter 71 as shown in FIG. 11, respective signals Y, B and R are represented by the following equation 11 using respective signals W, Cy, Ye and G:

$$\begin{cases} Y = (W + Ye + Cy + G)/8 \\ B = (W - Ye + Cy - G)/2 \\ R = (W + Ye - Cy - G)/2 \end{cases} \quad \text{(EQUATION 11)}$$

Here, in the case when complementary-color filter 71 shown in FIG. 11 is used and the all-pixel readout system is adopted, although the luminance signal Y is outputted from all the lattice points, the signal B is only outputted from even-numbered lattice points and the signal R is only outputted from odd-numbered lattice points. Therefore, at a lattice point in which j is an odd number, it is assumed that the same signal as signal B that is calculated at the adjacent lattice point on the left side (that is, the lattice point in which j is an even number) of the lattice point in question is outputted. In other words, it is assumed that $B_{(i, j=2m+1)}=B_{(i, j=2m)}$ holds (where m is an integral number). Similarly, at a lattice point in which j is an even number, it is assumed that the same signal as signal R that is calculated at the adjacent lattice point on the left side (that is, the lattice point in which j is an odd number) of the lattice point in question is outputted. In other words, $R_{(i, j=2n)}=R_{(i, j=2n-1)}$ holds (where n is an integral number). Therefore, respective signals $Y_{01}$, $B_{01}$ and $R_{01}$ are represented by the following equation 12.

$$\begin{cases} Y_{01} = & (W_{12} + Ye_{01} + Cy_{11} + G_{02})/8 \\ B_{01} = B_{00} = & (W_{00} - Ye_{01} + Cy_{11} - G_{10})/2 \\ R_{01} = & (W_{12} + Ye_{01} - Cy_{11} - G_{02})/2 \end{cases} \quad \text{(EQUATION 12)}$$

Therefore, luminance signal $Y_{01}$ and color-difference signals $U_{01}$ and $V_{01}$ are represented by the following equation 13 from equation 5 and equation 12:

$$\begin{cases} Y_{01} = & (W_{12} + Ye_{01} + Cy_{11} + G_{02})/8 \\ U_{01} = B_{01} - Y_{01} = & (3W_{12} + 3Ye_{01} - 5Cy_{11} - 5G_{02})/8 \\ V_{01} = R_{01} - Y_{01} = & (W_{00} - Ye_{01} + Cy_{11} - G_{10})/2 - \\ & (W_{12} + Ye_{01} + Cy_{11} + G_{02})/8 \end{cases} \quad \text{(EQUATION 13)}$$

Therefore, in this case also, luminance signal $Y_{01}$, color-difference signals $U_{01}$ and $V_{01}$, which are outputs from respective lattice points, have linear relationships with respect to signals from pixels W, Cy, Ye and G as shown by equation 13. Thus, in general, luminance signal $Y_{ij}$ and color-difference signals $U_{ij}$ and $V_{ij}$, which are outputs from a lattice point (i, j), are represented by equation 10 in the same manner.

Meanwhile, the vector quantization method has been known as an image compression/decompression technique that is applied to apparatuses such as the above-mentioned color CCD cameras and digital cameras. With respect to the vector quantization method, "Image Information Compression (edited by the Television Society, Ohm Publishing Co. Ltd, 1991)" gives a detailed explanation.

In a compression device using the vector quantization method, image information which is to be compressed is. divided into blocks, each having a total of M×N pixels, M longitudinally aligned pixels and N laterally aligned pixels, as one unit, in a manner so as not to overlap with each other. Then, one block is regarded as a vector having M×N components, that is, an M×N-dimensional spatial vector ↑X ($X_k$, k=0, 1, 2, . . . , M×N−1). Here, "↑" indicates that a symbol on the right side of this mark "↑" is a vector. Moreover, ↑X ($X_k$, k=0, 1, 2, . . . , M×N−1) indicates that M×N components of the vector ↑X is represented by $X_k$, with k being integral numbers from 0 to M×N−1. Additionally, the vector ↑X is also represented by a determinant $X_{pq}$ as described earlier. In this case, k, p and q has the relationship of k=Np+q.

Moreover, the compression device is preliminarily provided with a plurality of M x N dimensional spatial vector ↑C(s) (C(S)$_k$, k=0, 1, 2, . . . , M×N−1). Here, s is a number referred to as code-book number used for specifying each of the code-book vectors ↑C(s). A set of the code-book vectors ↑C(s) is referred to as code book. The compression device selects a code-book vector ↑C(s) that is most close to a vector ↑X corresponding to each block among a plurality of code-book vectors ↑C(s), and outputs the code-book number S as the compression code indicating the block.

A decompression device is provided with code-book vectors ↑C(s) in the same manner as the compression device. Thus, it selects a code-book vector ↑C(s) based upon the code-book number S sent from the compression device, and decodes each of the respective blocks.

An image-information compression method referred to as the mean-value separation and normalization vector quantization method, which is an expanded vector quantization method, has been known as another compression and decompression technique for images in apparatuses such as the aforementioned color CCD cameras and digital cameras. With respect to this compression method, the above-mentioned "Image Information Compression (edited by the Television Society, Ohm Publishing Co. Ltd, 1991)" also gives a detailed explanation.

In a compression device using this method, image information that is to be compressed is divided into blocks each of which is represented by an M×N dimensional spatial vector, in the same manner as the compression device using the vector quantization method. Here, the mean value "mean" of vector ↑X corresponding to one block is calculated by the following equation 14. Then, the difference vector ↑X' (X'$_k$, k=0, 1, 2, . . . , M×N−1) is calculated by equation 15.

$$\text{mean} = \frac{1}{M \cdot N} \sum_{k=0}^{M \cdot N-1} Xk \quad \text{(EQUATION 14)}$$

$$X'_k = X_k - \text{mean} \quad \text{(EQUATION 15)}$$

This compression device is also provided with the above-mentioned code-book vectors ↑C(s). Here, the total number of the code-book vectors ↑C(s) is set at 1024; that is, s=1 through 1024. Moreover, it is assumed that the size of the code-book vectors ↑C(s) is standardized to 1. In other words, all the vectors ↑C(s) satisfy the following equation 16.

$$\sum_{k=0}^{M \cdot N-1} C(s)k \cdot C(s)_k = 1 \qquad \text{(EQUATION 16)}$$

Moreover, in the compression device, inner products I(s) between the difference vectors ↑X' of the respective blocks and code-book vectors ↑C(S) are calculated by the following equation 17. Then, the code-book vector ↑C(S) that provides the largest inner product I(S) is used as the code-book vector representing the corresponding block. The code book number S of the code-book vector ↑C(S) that provides the largest inner product I(S) is referred to as "shape" of the block. Further, the largest inner product I(S) is referred to as "gain" of the block. These "mean", "shape" and "gain" are compression codes constituting compression signals of the respective blocks, and form output signals of the compression device.

$$I(s) = \sum_{k=0}^{M \cdot N-1} C(s)k \cdot X'_k \qquad \text{(EQUATION 17)}$$

The same code-book vectors ↑C(s) as those of the compression device are also provided in the decompression device, that is, on the decoder side. In the decompression device, when the compression codes, mean, shape and gain, are inputted from the compression device, a code-book vector ↑C(S) corresponding to the code "shape" is selected among the code-book vectors ↑C(s). By using the ↑C(S) and the rest two compression codes, "mean" and "gain", the vector ↑X" is generated based upon the following equation 18. The vector ↑X" is a vector after decompression that is used for re-constructing each block in association with the vector ↑X prior to compression. When the vector ↑X" has been selected for each of the entire blocks of the image information, the decompression of the image information is completed, and the image information is re-constructed.

$$X''_k = \text{mean} + \text{gain} \cdot C(S)_k \qquad \text{(EQUATION 18)}$$

In recent years, along with the popularization of portable still cameras, there are ever-increasing demands for small-size apparatuses also in the aforementioned color CCD cameras and digital cameras for ease of carrying. However, the color CCD camera in Japanese Laid-Open Patent Publication No. 184127/1995 (Tokukaihei 7-184127) of FIG. 7 has a construction in which, after the output signal of the color CCD unit 51 has been converted into a luminance signal and a color-separation signal through color-separation processes, these signals are compressed. This requires a circuit construction for carrying out color-separation and compression; therefore, the color CCD camera needs to have a large-scale circuit, resulting in problems of large size in the entire apparatus and high production costs.

Moreover, as described earlier, in the prior art technique shown in Japanese Laid-Open Patent Publication No. 37202/1997 (Tokukaihei 9-37202), the color separation processes are not carried out in the digital camera so as to miniaturize the circuit scale of the digital camera serving as a compression device. However, the color separation processes have to be carried out in the reproducing device serving as a decompression device, resulting in problems of large size of the reproducing device and high production costs.

SUMMARY OF THE INVENTION

The present invention has been devised to solve the above-mentioned problems, and its objective is to provide a small-size color solid-state image-pickup camera system at low production costs, by reducing the amounts of processes for carrying out signal separation on image information, such as color-separation processes, etc., and miniaturizing the circuit scale of the entire system, as compared with a conventional system.

In order to achieve the above-mentioned objective, the color solid-state image-pickup camera system of the present invention is provided with: an image-pickup section for acquiring color image information consisting of a plurality of pixel signals by picking up an image; a first storage section for preliminarily storing a plurality of code-book vectors as quantization representative vectors; a coding section which divides the color image information into a plurality of blocks with each block containing a predetermined number of pixel signals, selects a code-book vector corresponding to each block among the plurality of code-book vectors stored in the first storage means upon carrying out vector quantization, and outputs information for specifying the selected code-book vector as a compression signal corresponding to each block; a second storage section for preliminarily storing a plurality of kinds of decompression code-book vectors corresponding to the respective code-book vectors; and a decoding section which specifies a code-book vector corresponding to each block based upon the compression signal, selects the plurality of kinds of decompression code-book vectors corresponding to the code-book vector from the second storage means, and reconstructs the color image information by decoding pixel signals constituting each block for each of the kinds of the decompression code-book vectors that have been selected.

With the above-mentioned construction, the color solid-state image-pickup camera system compresses the color image information acquired by the vector quantization. In other words, the color image information consisting of pixel signals derived from a plurality of pixels is divided into blocks each of which consists of a predetermined number of pixel signals, and each block is transformed into a vector. This vector conversion is carried out by, for example, transforming each block into a vector having the predetermined number of dimensions using the output values of the pixel signals as its components. Then, among the plurality of code-book vectors preliminarily stored in the first storage section, for example, the one that is most similar to a vector representing each block is selected, and the selected code-book vector is defined as a vector corresponding to the block. Further, corresponding code-book vectors are extracted from the entire blocks of the color image information, and information such as serial numbers for identifying the respective code-book vectors is extracted, thereby completing compression of the color image information. In other words, the set of information for identifying the code-book vectors corresponding to the respective blocks is given as compressed information with respect to the color image information.

Here, code-book vectors refer to a plurality of vectors that have the same dimension as a vector representing each block and that are different from each other.

In the color solid-state image-pickup camera system of the present invention, in order to decompress the compressed color image information, the second storage section preliminary stores a plurality of kinds of decompression code-book vectors that correspond to the respective code-book vectors described above. That is, a plurality of kinds of decompression vectors are stored in association with one code-book vector.

The decoding section identifies a code-book vector corresponding to each block based upon the information for identifying code-book vectors that is compressed color image information. Then, the decoding section selects a plurality of decompression code-book vectors corresponding to each code-book vector from the second storage section so that it decodes one piece of image information for each kind of decompression code-book vectors. Therefore, when color image information is decompressed, pieces of image information the number of which corresponds to the kinds of the decompression code-book vectors are obtained.

The plurality of kinds of decompression code-book vectors are determined by, for example, the kinds of color image information that the user desires. For example, when an attempt is made to decompress a piece of color image information with its colors being separated, each code-book vector is preliminarily subjected to a color-separation process, and the luminance component and the color-difference component are separated from each other so that the respective components are provided as decompression code-book vectors corresponding to each code-book vector.

In this case, each code-book vector is preliminarily subjected to a signal-separation process that is to be applied after decompression of a color image information, such as, for example, a color-separation process, and a plurality of kinds of vectors obtained after the process are stored in the second storage section as decompression code-book vectors; this makes it possible to eliminate the processing circuit for signal separation. Thus, the color solid-state image-pickup camera system of the present invention is allowed to carry out a desired signal-separation process without the necessity for a large circuit scale and without causing high production costs.

For a fuller understanding of the nature and advantages of the invention, reference should be made to the ensuing detailed description taken in conjunction with the accompanying drawings.

BRIEF DESCRIPTION OF THE DRAWINGS

FIG. 9 is an explanatory drawing that shows a structural example of a complementary-color filter.

FIG. 11 is an explanatory drawing that shows another structural example of a complementary-color filter.

DESCRIPTION OF THE EMBODIMENTS

EMBODIMENT 1

The following description will discuss the first embodiment of the present invention.

Figure 1:
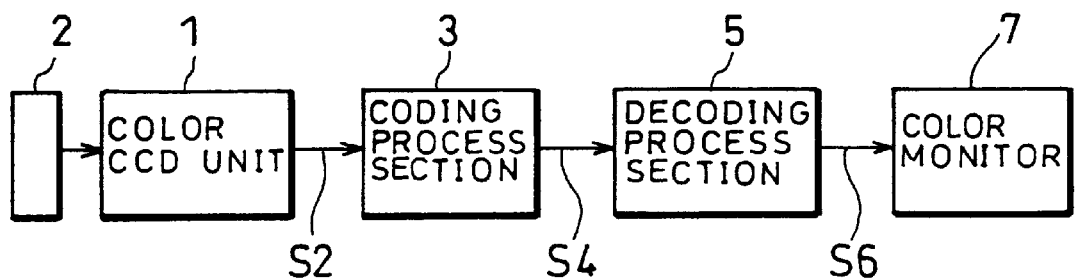
FIG. 1 is a block diagram that shows a construction of a color CCD camera system in accordance with one embodiment of the present invention.
Figure 11:
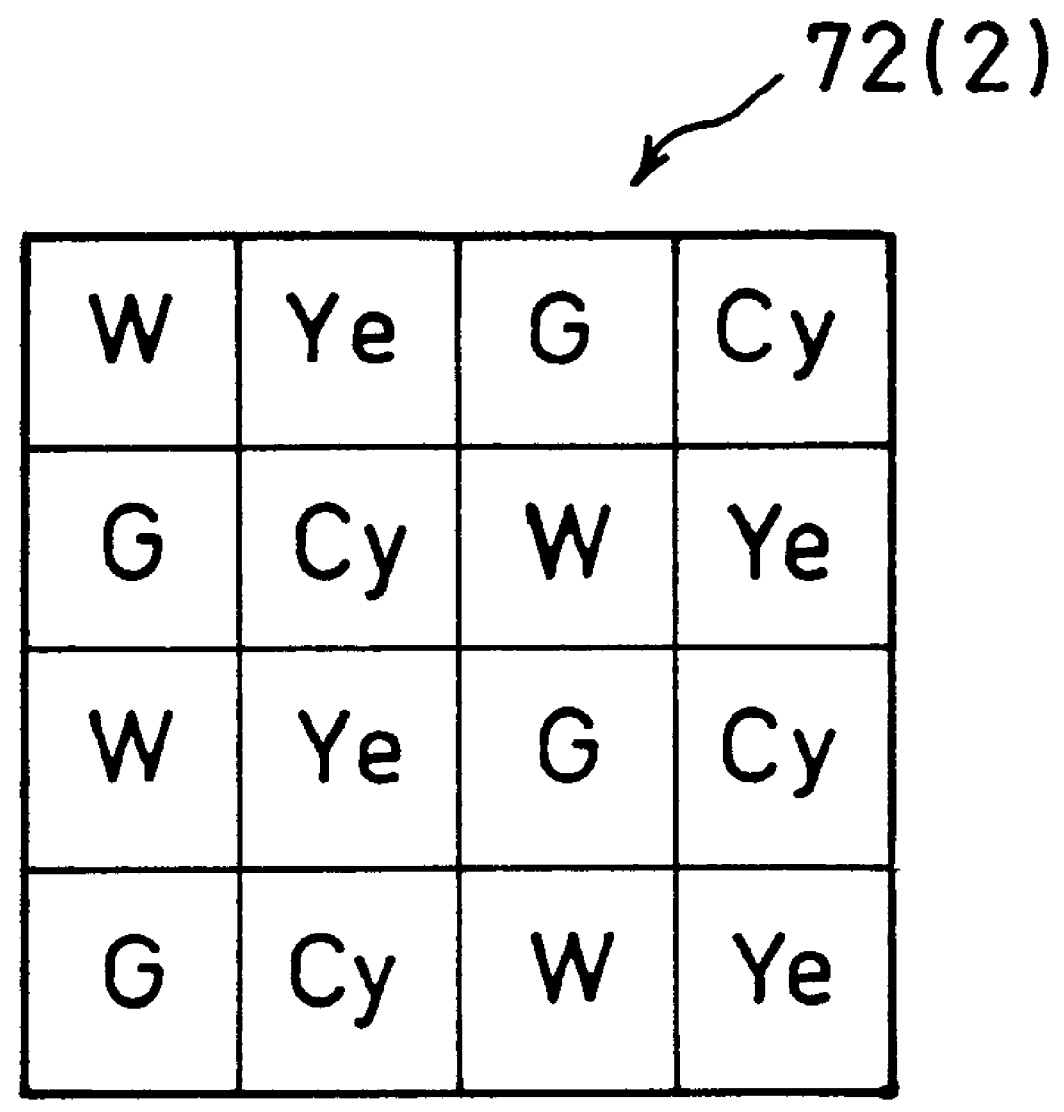

FIG. 1 is a block diagram that shows a schematic construction of a color CCD camera system (hereinafter, referred to as the present camera system) in accordance with the present embodiment. As illustrated in FIG. 11, the present camera system is provided with: a complementary-color filter 2, a color CCD unit 1 and a coding process section 3 that constitute a digital camera, and a decoding process section 5 and a color monitor 7 that constitute a reproducing device.

The color CCD unit 1, which is used for picking up an image of a subject so as to acquire image information, is a CCD unit having 288 longitudinal×352 lateral pixels. Signals S2, outputted from the color CCD unit 1, are set so as to have the same number of electric signals as the number of pixels of the color CCD unit 1, that is, 288×352 signals, per one screen. The color CCD unit is provided with a complementary-color filter 2 having a pattern as shown in FIG. 11. As illustrated in FIG. 11, this pattern consists of pixels of four colors, that is, white (W) yellow (Ye), cyan (Cy) and green (G), and has a size of 4 longitudinal×4 lateral pixels, that is, a total of 16 pixels. The complementary filter 2 of the color CCD unit 1 is constructed by repeating this pattern.

The coding process section 3 carries out data decompression on output signals S2 from the color CCD unit 1 by using the vector quantization method. Since the pattern of the complementary-color filter 2 has a size of 16 pixels as described above, the dividing process into blocks, carried out by the coding process section 3 for the vector quantization method, treats 16 pixels as one unit. Further, the dividing process is carried out without having any shared pixels between adjacent blocks.

Moreover, since one block is considered to have 16 signal components, one block is regarded as a 16-dimensional vector. Therefore, a vector representing one block is hereinafter referred to as vector $\uparrow X$ ($X_k$, k=0, 1, 2, ..., 15).

Figure 2:
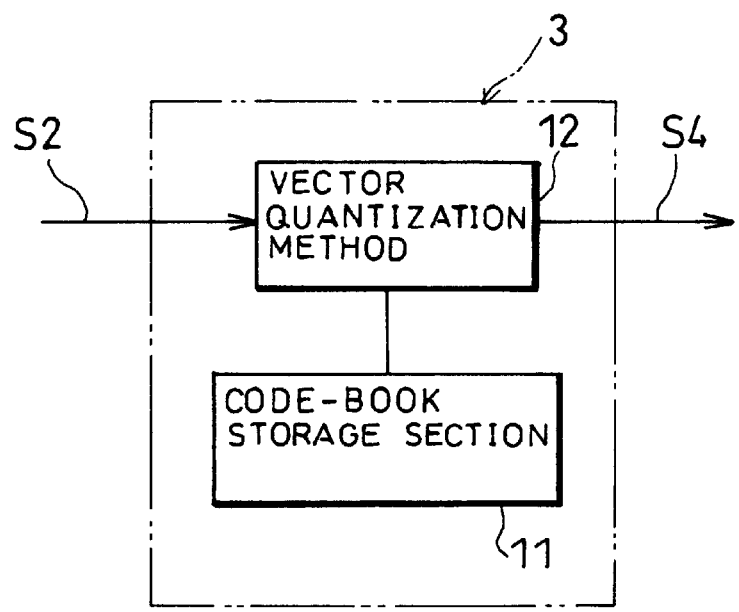
FIG. 2 is a block diagram that shows a construction of a coding process section in the color CCD camera system shown in FIG. 1.

FIG. 2 is an explanatory drawing that schematically shows the construction of the coding process section 3. As illustrated in FIG. 2, the coding process section 3 is constituted by a code-book storage section (first storage means) 11 and a vector quantization section (coding means) 12. The code-book storage section 11 is used for storing a plurality of 16-dimensional code-book vectors $\uparrow C(s)$ ($C(s)_k$, k=0, 1, 2, ..., 15). In the following description, the number of these code-book vectors $\uparrow C(s)$ is set to 64; in other words, s=0 through 63. Moreover, the vector quantization section 12 divides inputted signals S2 in predetermined blocks, and creates vectors $\uparrow X$ corresponding to the respective blocks. Furthermore, the vector quantization section 12 selects a code-book vector $\uparrow C(s)$ corresponding to each vector $\uparrow X$ one by one among the code-book vectors $\uparrow C(c)$ stored in the code-book storage section 11.

The following description will discuss how to make the code-book vector ↑C(s). When, upon picking up images from various subjects by using the color CCD unit 1, image signals S2 corresponding to the respective subjects are inputted to the coding process section 3, the vector quantization section 12 first divides these image signals S2 into blocks, and forms a plurality of 16-dimensional vectors ↑X. For example, in the case of 1000 images picked up from various subjects, since 72×88 ((288/4)×(352/4)) blocks exist, 72×88×1000 vectors ↑X are obtained.

Next, with respect to these vectors ↑X, representative vectors, which are adopted as code-book vectors ↑C(s), are calculated by using a method referred to as the LBG algorithm. For a detailed explanation of this method, refer to "pages 127–130, Image Information Compression (edited by the Television Society, published by Ohm Co., Ltd, 1991)". The LBG algorithm is an algorithm that is clearly described in a report named "Algorithm for Vector Quantizer Design: by Y. Linde, A. Buzo and R. M. Gray, IEEE Trans., COM-28, 1, pp. 84–95 (January 1980)".

Figure 3:
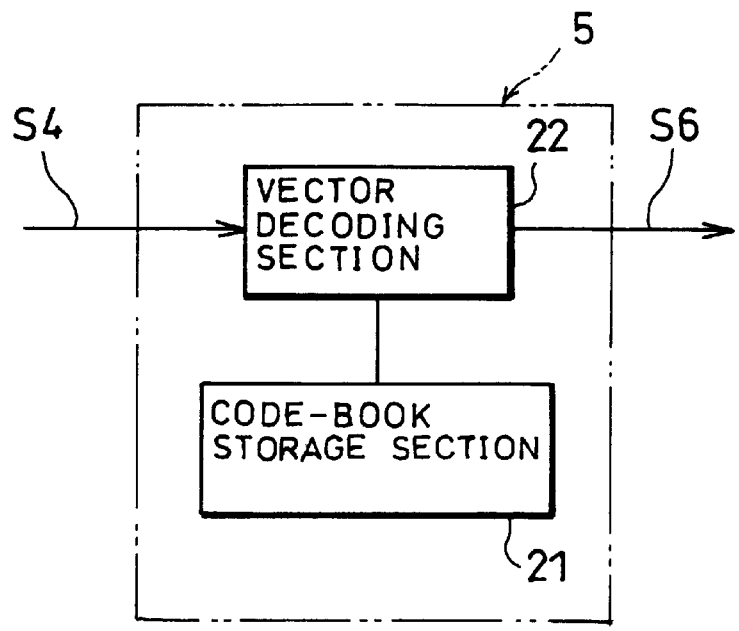
FIG. 3 is a block diagram that shows a construction of a decoding process section in the color CCD camera system shown in FIG. 1.

The decoding process section 5, as illustrated in FIG. 1, is used for decoding signals S4 outputted from the coding process section 3. FIG. 3 is an explanatory drawing that schematically shows the construction of the coding process section 5. As illustrated in FIG. 3, the decoding process section is provided with a code-book storage section (second storage means) 21 for storing code-book vectors which will be described later, and a vector decoding section (decoding means) 22 for selecting a predetermined code-book vector from the code-book storage section 21 in accordance with the signals S4 inputted from the coding process section 3.

In the code-book storage section 21 are stored three kinds of code-book vectors ↑Cy(s), ↑Cu(s) and ↑Cv(s), which are used for outputting the luminance signal Y and color-difference signals U and V in accordance with each of the code-book numbers s of the code-book vectors ↑C(s) in the above-mentioned coding process section 3. In other words, with respect to one code-book number s, a luminance code-book vector ↑Cy(s) corresponding to the luminance signal and color-difference code-book vectors ↑C(s) and ↑Cv(s) corresponding to the color-difference signals are stored. The following description will discuss how to create these code-book vectors ↑Cy(s), ↑Cu(s) and ↑Cv(s) (decompression code-book vector) in the vector decoding section 22.

In the vector decoding section 22, with respect to the code-book vectors ↑C(s) stored in the code-book storage section 11, the code-book vectors ↑Cy(s), ↑Cu(s) and ↑Cv(s) are created by the virtual color-separation method which will be described later, and stored in the code-book storage section 21. The following description will discuss the virtual color-separation method.

In general, natural light contains various components, and has infinite degrees of freedom. However, in the case when such light is received through a filter member such as a complementary-color filter 2, since the number of pixels (the number of color filters) of the filter member is finite, the number of image signals (image information) to be outputted from the respective pixels of the color CCD unit 1 is also finite. In this case, the number of image signals is the same as the number of pixels of the filter member. Therefore, the color CCD unit 1 represents natural light having infinite degrees of freedom by approximating it using signals whose number is finite.

In the virtual color-separation method, assuming conceptionally that the degrees of freedom of light that is made incident on the complementary-color filter 2 are the same as the degrees of freedom of the number of pixels of the complementary-color filter 2, image information outputted from the color CCD unit 1 is supposedly represented without reducing the degrees of freedom of light that is made incident on the complementary-color filter 2.

In other words, 16 (=4×4) signals exist in one block that has been cut out in the vector quantization section 12 in the coding process section 3, and the degrees of freedom are 16. In the virtual color-separation method, these 16 signals are assumed to be equal to the degrees of freedom of light that is made incident on the complementary filter 2. In this case, the luminance signal Y and the color-difference signals U and V of light that is supposed to be made incident on one block have 16 components respectively, and a total of 48 components exist. However, since it is not possible to calculate independent 48 variables from independent 16 variables, it is impossible to perfectly reproduce light that has been made incident on the color CCD unit 1 from the outputs of the color CCD unit 1 as the luminance signal Y and the color-difference signals U and V.

Therefore, in the virtual color-separation method, it is assumed that among the 48 spatial frequency components of the luminance signal Y and the color-difference signals U and V, 32 components that are difficult to be perceived by the human visual sense are zero. In other words, it is assumed that the 48 components of the luminance signal Y and the color-difference signal U and. V in the real space are constituted by the combinations of 16 independent components. Based on such an assumption, it becomes possible to reproduce the luminance signal Y and the color-difference signals U and V that are made incident on the color CCD unit 1 in a desired manner from the outputs of the color CCD unit 1.

The following description will discuss the signal processing of the virtual color-separation method.

Figure 13:
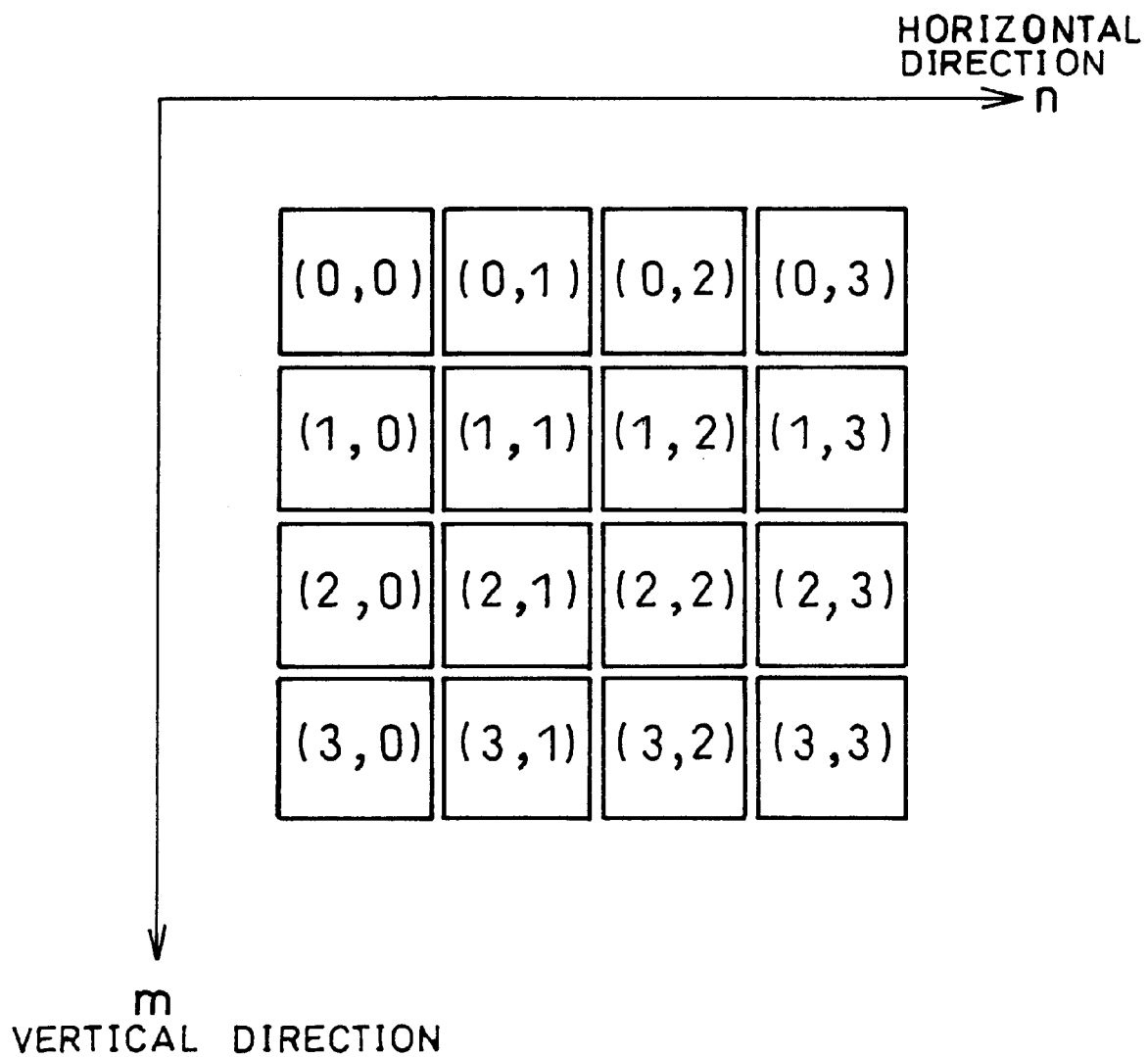
FIG. 13 is an explanatory drawing that shows spatial frequency components of a luminance signal and a color-difference signal.

FIG. 13 shows 16 spatial frequency components of each of $Y_{mn}$ and $U_{mn} \cdot V_{mn}$ in the luminance signal Y and the color-difference signals U and V that are arranged on a plane with n in the horizontal direction and m in the vertical direction. In FIG. 13, taking (0, 0) component as DC component, high-frequency components are plotted as m and n increase. In order to transform such luminance signal $Y_{mn}$ and color-difference signals $U_{mn} \cdot V_{mn}$ into components $Y_{ij}$ and $U_{ij} \cdot V_{ij}$ in actual space, transform is carried out by using the following equation 19. Here, in the equation, $F^{-1}{}_{ijmn}$ is a coefficient used for reversely transforming the Discrete Cosine Transform (hereinafter referred to as DCT transform) that is one kind of orthogonal transforms, shown in equation 20. Further, i and j in equation 19 are subscripts that represent respective components in real space in the luminance signal Y and color-difference signals U·V; and i=0~3 and j=0~3 old.

$$\begin{cases} Y_{ij} = \sum_{m,n} F^{-1} ijmn \cdot Ymn \\ U_{ij} = \sum_{m,n} F^{-1} ijmn \cdot Umn \\ V_{ij} = \sum_{m,n} F^{-1} ijmn \cdot Vmn \end{cases} \quad \text{(EQUATION 19)}$$

$$F_{mnij} = \frac{1}{4} C_m C_n \cos\frac{(2i+1)m\pi}{16} \cos(2j+1)n\frac{\pi}{16} \quad \text{(EQUATION 20)}$$

where mn: position of DCT coefficient, $$C_m C_n = \begin{cases} \frac{1}{\sqrt{2}} & \text{(when } m, n = 0\text{)} \\ 1 & \text{(when } m, n \neq 0\text{)}. \end{cases}$$

Further the relationships among the luminance signal Y, the color-difference signals U·V and the R, G and B signal in real space are represented by the following equation 21. Moreover, the relationships among the R, G and B signals and the W, Ye, Cy and G signals representing the respective colors arranged on the complementary-color filter 2 are represented by the following equation 22.

$$\begin{pmatrix} R \\ G \\ B \end{pmatrix} = \begin{bmatrix} 1.0 & 0.0 & 1.4 \\ 1.0 & -0.3 & -0.7 \\ 1.0 & 1.8 & 0.0 \end{bmatrix} \begin{pmatrix} Y \\ U \\ V \end{pmatrix} \quad \text{(EQUATION 21)}$$

$$\begin{pmatrix} W \\ Ye \\ Cy \\ G \end{pmatrix} = \begin{bmatrix} 1 & 1 & 1 \\ 1 & 1 & 0 \\ 0 & 1 & 1 \\ 0 & 1 & 0 \end{bmatrix} \begin{pmatrix} R \\ G \\ B \end{pmatrix} \quad \text{(EQUATION 22)}$$

Here, since any of equation 19, equation 21 and equation 22 are transformed based upon a linear relationship, they are represented by the following equation 23 using one linear transform $Z_{pqcmn}$. In this equation, p and q are subscripts indicating the coordinates of each pixel in one block; and p=0~3 and q=0~3 hold. Moreover, $C_{cmn}$ on the right term represents the spatial frequency component $Y_{mn}$ of the luminance signal $Y_{ij}$ when the subscript c=0, represents the spatial frequency component $U_{mn}$ of the color-difference signal $U_{ij}$ when the subscript c=1, and also represents the spatial frequency component $V_{mn}$ of the color-difference signal $V_{ij}$ when the subscript c=2.

$$X_{pq} = \sum_{c,m,n} Z_{pqcmn} \cdot C_{cmn} \quad \text{(EQUATION 23)}$$

where
$C_{0mn}=Y_{mn}$ (m,n=0, 1, 2, 3)
$C_{1mn}=U_{mn}$ (m,n=0, 1, 2, 3)
$C_{2mn}=V_{mn}$ (m,n=0, 1, 2, 3)

As described earlier, in fact, $C_{cmn}$ in equation 23 has a total of 48 components, and $X_{pq}$ forming the left term of this equation has 16 components. Therefore, the equation normally is not inversely transformed. Accordingly, in the virtual color-separation method, assuming that 32 components of $C_{cmn}$ are zero, and $Z_{pqcmn}$, used in calculating $C_{cmn}$ that have been set to zero, are also set to zero. With this method, it is possible to assume $Z_{pqcmn}$ to be a non-singular matrix; and it is possible to allow $Z_{pqcmn}$ to have an inverse matrix depending on the selection of $C_{cmn}$ components that are set to zero.

For example, as in the case of the present camera system, when pixels having the color arrangement of the complementary-color filter 2 shown in FIG. 11 are divided into 4×4 blocks, 0 is taken as shown in the following equation 24 in order to allow $Z_{pqcmn}$ to have an inverse matrix. This means that (3, 1) and (3, 2) components of the luminance signal $Y_{mn}$ and all the AC components (15 components respectively) of the color-difference signals $U_{mn}$ and $V_{mn}$ are set to zero. In this case, $Z_{pqmn}$ is allowed to have an inverse matrix so that equation 23 is allowed to have an inverse transform. Then, assuming that this inverse transform is $W_{cmnpq}$ the inverse transform of equation 23 is represented by equation 25. When the luminance signal $Y_{mn}$ and the color-difference signals $U_{mn} \cdot V_{mn}$ thus obtained are subjected to an inverse transform of the transform as shown in equation 20, color-separated signals consisting of the luminance signal Y and the color-difference signals U·V, each having 16 components, are obtained. Therefore, the following equation 26 is used in order to obtain the color-separated signals consisting of the luminance signal Y and the color-difference signals U·V, each having 16 components, from the output of 16 components of W, Ye, Cy and G of the color CCD unit 1.

$$C_{1mn}=C_{2mn}=0 \ (m \neq 0 \text{ or } n \neq 0) \ C_{031}=C_{032}=0 \quad \text{(EQUATION 24)}$$

$$C_{cmn} = \sum_{p,q} W_{cmnpq} \cdot X_{pq} \quad \text{(EQUATION 25)}$$

where
$C_{0mn}=Y_{mn}$ (m, n)≠(3, 1) or (3, 2)
$C_{1mn}=U_{mn}$ (m=0, n=0)
$C_{2mn}=V_{mn}$ (m=0, n=0)

$$C_{cij} = \sum_{m,n,p,q} F^{-1}_{ijmn} \cdot W_{cmnpq} \cdot X_{pq} \quad \text{(EQUATION 26)}$$

where
$C_{oij}=Y_{ij}$
$C_{1ij}=U_{ij}$
$C_{2ij}=V_{ij}$

Here, AC components of the color-difference signals U and V are difficult to be sensed by the human visual sense as compared with AC components of the luminance signal Y. Further, (3, 1) and (3, 2) components of the luminance signal Y are also difficult to be sensed by the human visual sense since they are high-frequency components among the AC components. Therefore, even if the assumption as indicated by equation 24 is made, degradation in the image to be reproduced does not pose any problem.

As described above, in the virtual color-separation method, part of components in the spatial frequency components of the luminance signal Y and the color-difference signals U and V is assumed to be zero; this makes it possible to properly reproduce the luminance signal Y and the color-difference signals U and V from the output of the color CCD unit 1 without giving adverse effects on the reproduced state.

In the present camera system, by using the virtual color-separation method as described above, code-book vectors ↑Cy(s)·↑Cu(s)·↑Cv(s), which are decompression code-book vectors, are created from the code-book vector ↑C(s). In other words, the vector decoding section 22 creates code-book vectors ↑Cy(s)·↑Cu(s)·↑Cv(s) representing the luminance signal Y and the color-difference signals U and V by transforming the code-book vector ↑C(s) formed by the vector quantization section 12 using the following equation 27, and these are stored in the code-book storage section 21. In equation 27, i and j of equation 26 are collectively represented by k=4i+j, and p and q thereof are also collectively represented by l=4p+q.

$$Cy(s)_k = \sum_{m,n,l} F_{kmn}^{-1} \cdot W_{ymnl} \cdot C(s)_l \quad \text{(EQUATION 27)}$$

$$Cu(s)_k = \sum_{m,n,l} F_{kmn}^{-1} \cdot W_{umnl} \cdot C(s)_l$$

$$Cv(s)_k = \sum_{m,n,l} F_{kmn}^{-1} \cdot W_{vmnl} \cdot C(s)_l$$

The following description will discuss operations of compression and decoding processes of image information in the present camera system.

As described earlier, the number of signals S2 per one screen that are outputted from the color CCD unit 1 to the coding process section 3 is the same as the number of pixels of the color CCD unit 1, that is, 288×352 signals. In the coding process section 3, the vector quantization section 12 divides these 288×352 signals into blocks, each consisting of 4 longitudinal signals×4 lateral signals, that is, a total of 16 signals. Then, the vector quantization section 12 acquires the vector ↑X that represents each of the blocks, and calculates distances D(s) between the vector ↑X and all the code-book vectors ↑C(s) stored in the code-book storage section 11. The calculations of distances D(s) are carried out based upon sum of squares of respective components between the vector ↑X and the code-book vectors ↑C(s); and the following equation 28 is used.

$$D(s) = \sum_{k=0}^{15} (X_k - C(s)_k)^2 \quad \text{(EQUATION 28)}$$

Among the code-book vectors ↑C(s), the one that provides the minimum distance D(S) with respect to the vector ↑X of each block is defined as the code-book vector ↑C(S) corresponding to the vector ↑X of each block, and the number S is outputted to the decoding process section 5 as the signal S4 of each block. Then, in order to carry out a data compression process on signals corresponding to one screen, the vector quantization section 12 repeats the retrieving operation of the code-book vector ↑C(S) and the outputting operation of the signal S4 for all the 72×88 (=(288/4)×(352/4)) blocks.

The following description will discuss a decompression process (decoding process) in the decoding process section 5. The vector decoding section 22 in the decoding process section 5 selects S-numbered code-book vectors ↑Cy(S), ↑Cu(S) and ↑Cv(S) that have been specified by compression code S41 inputted from the coding process section 3 among the code-book vectors ↑Cy(s), ↑Cu(s) and ↑Cv(s) stored in the code-book storage section 21, and the luminance signal $Y_k$ and the color-difference signals $U_k$ and $V_k$ of each block are generated in accordance with the following equation 29. Then, the luminance signal Yk and the color-difference signals $U_k$ and $V_k$ are generated for all the 72×88 (=(288/4)×(352/4)) blocks corresponding to one screen so that the image information is re-constructed and outputted to the color monitor 7 as the reproduction signal S6.

$$\begin{cases} Y_k = Cy(S)_k \\ U_k = Cu(S)_k \\ V_k = Cv(S)_k \end{cases} \quad \text{(EQUATION 29)}$$

As described above, in the present camera system, the code-book vector ↑C(s) of one kind for compressing each block is stored in the code-book storage section 11 of the coding process section 3, and the code-book vectors ↑Cy(s), ↑Cu(s) and ↑Cv(s) corresponding to the luminance signal Y and the color-difference signals U and V are stored in the code-book storage section 21 of the decoding process section 5 as code-book vectors for decompressing each block.

Upon receipt of the code-book number S of the code-book vector ↑C(S) corresponding to the vector ↑X representing one block, the vector decoding section 22 of the decoding process section 5 selects code-book vectors ↑Cy(s), ↑Cu(s) and ↑Cv(s) representing the luminance signal Y and the color-difference signals U and V from the code-book storage section 21 based upon the number S, and decompresses the corresponding block.

Therefore, merely by carrying out a decompressing operation in accordance with the vector quantization method in the decoding process section 5, the present camera system makes it possible to also carry out a color-separation operation on the vector ↑X that has been compressed as signal S4. For this reason, neither the digital camera consisting of the color CCD unit 1 and the coding process section 3 nor the reproducing device consisting of the decoding process section 5 and the color monitor 7 is required to possess a color-separation circuit for separating image information acquired by picking up an image into the luminance signal Y and the color-difference signals U and V. Thus, it becomes possible to provide a small-size color CCD camera system with a small circuit scale at low production costs.

Moreover, in the color-separation process that has been described as a conventional technique using equations 1 through 13, the luminance signal Y and the color-difference signals U and V are created by adding and subtracting adjacent four pixels within a block, upon forming the luminance signal Y and the color-difference signals U and V; therefore, pixels have to be shared between the adjacent blocks so as to calculate the luminance signal Y and the color-difference signals U and V at the border of the blocks. In other words, the luminance signals Y and the color-difference signals U and V, each having the number of (N−1)×(M−1), are calculated with respect to blocks, each having N×M pixels. Consequently, it is not possible to simultaneously carry out the compression and decompressing operations by means of the vector quantization and the color-separation operation for each block.

However, in the present camera system, the dividing operation into blocks is carried out in a manner so as not to share pixels between adjacent blocks, and in order to form the code-book vectors ↑Cy(s), ↑Cu(s) and ↑Cv(s), the number of components of the code-book vectors ↑C(s) is made the same as the number of components of each of the code-book vectors ↑Cy(s), ↑Cu(s) and ↑Cv(s). Therefore, it becomes possible to simultaneously carry out the compression and decompressing operations of image information by means of the vector quantization and the color-separation operation.

Additionally, in the present embodiment, upon forming the code-book vectors ↑Cy(s), ↑Cu(s) and ↑Cv(s) in the vector coding section 22, the assumption as shown in equation 24 is made; however, the way in which zero is taken in $C_{cmn}$ is not intended to be limited by the examples shown in this equation. Any of $C_{cmn}$ may be assumed as zero as long as $Z_{pqcmn}$ in equation 23 has an inverse matrix and no visual difference occurs in image information after the decompression in the decoding process section 5 as compared with the image information before the compression. Here, the assumption shown in equation 24 is effective in the case when one block has 4×4 pixels and the complementary color filter 2 shown in FIG. 11 is utilized.

Moreover, the number of pixels (the number of signals) in one block may be set to a number other than 4×4, for example, 8×8. As in the case of 4×4, components that are to be set at zero in the spatial frequency components are properly selected so as to allow $Z_{pqcmn}$ in equation 23 to have an inverse matrix and to enhance the quality of an image to be reproduced as high as possible; thus, it becomes possible to reproduce image information favorably.

Furthermore, the Discrete Cosine Transform, shown in equation 20, is utilized as an equation for making a transformation to spatial frequency components; however, any type of transform may be applied as long as it makes a transformation between real space and the frequency space.

Additionally, the code-book storage section 21 is supposed to store the code-book vectors ↑Cy(s), ↑Cu(s) and ↑Cv(s) representing the luminance signal Y and the color-difference signals U and V; however, the present invention is not intended to be limited thereby.

EMBODIMENT 2

The following description will discuss the second embodiment of the present invention. Here, in the present embodiment, those members that have the same functions and that are described in embodiment 1 are indicated by the same reference numerals and the description thereof is omitted.

Figure 4:
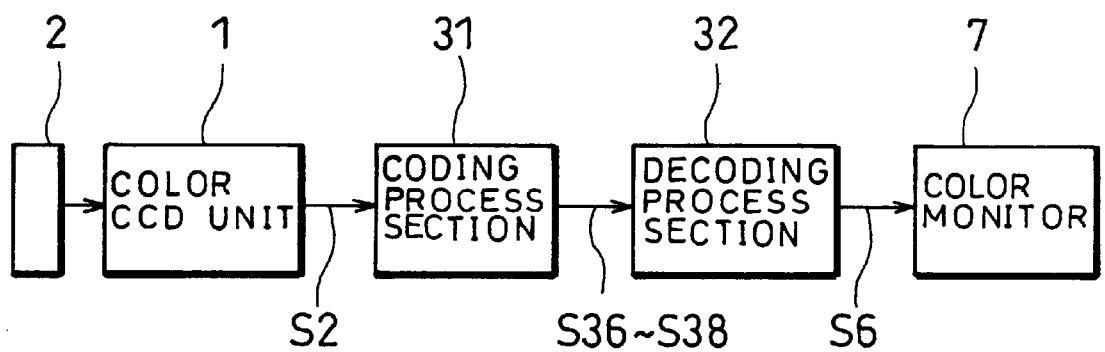
FIG. 4 is a block diagram that shows a schematic construction of a color CCD camera system in accordance with the second embodiment of the present invention.

FIG. 4 is an explanatory drawing that shows a construction of a color CCD camera system (hereinafter, referred to as the present camera system) in accordance with the present invention. As illustrated in this Figure, the present camera system has a construction in which in the construction of the camera system shown in FIG. 1, the coding process section 3 is replaced by a coding process section 31 and the decoding process section 5 is replaced by a decoding process section 32.

Figure 5:
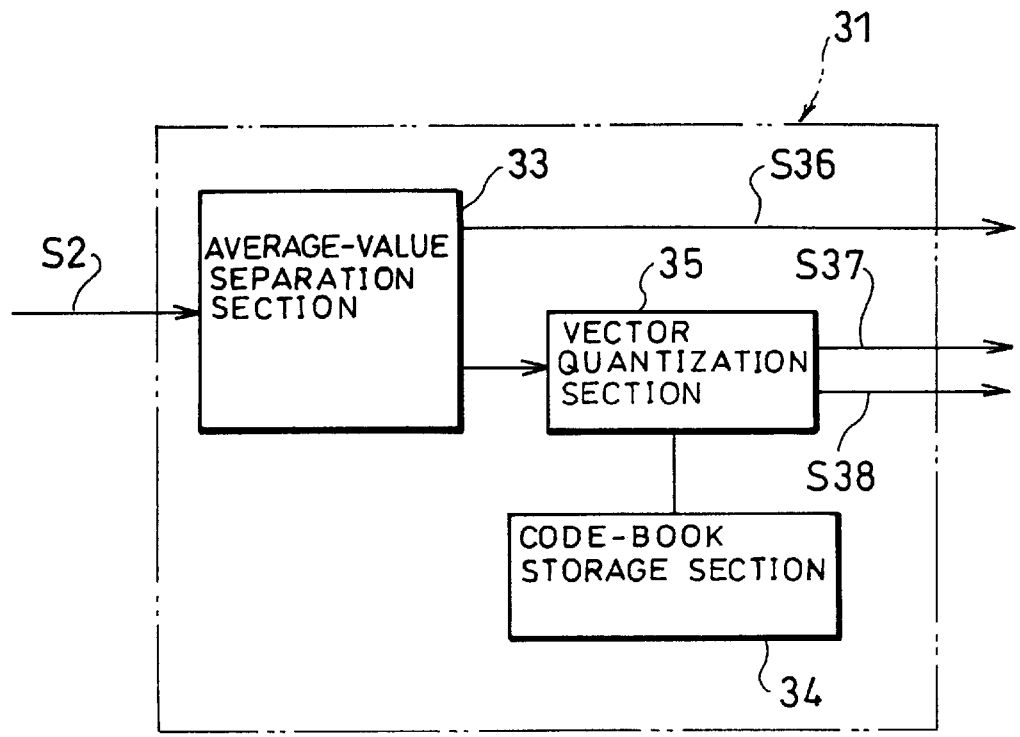
FIG. 5 is a block diagram that shows a construction of a coding process section in the color CCD camera system shown in FIG. 4.

FIG. 5 is an explanatory drawing that shows a schematic construction of the coding process section 31. As illustrated in this Figure, the coding process section 31 is provided with an average-value separation section (coding means) 33, a code-book storage section (first storage means) 34 and a vector quantization section (coding means) 35.

The average-value separation section 33 divides output signals of the color CCD unit 1 into blocks, each consisting of 4 longitudinal×4 lateral signals as one unit, that is, a total of 16 signals, and acquires vectors ↑X corresponding to the respective blocks. Further, with respect to the vectors ↑X, the average-value separation section 33 calculates the average values mean y, mean u and mean v, and also calculates the difference vectors ↑X' of the vectors ↑X, and then outputs them to the decoding process section 32 as signal S36. An explanation will be given later of these average values mean y, mean u and mean v and the difference vectors ↑X'.

The code-book storage section 34 is used for storing difference code-book vectors ↑C'(s) consisting of a set of 64 vectors $(C'(s)_k, s=0, 1, \ldots, 63, k=0, 1, 2, \ldots, 15)$. The difference code-book vectors ↑C'(s) will be described later. The vector quantization section 35 calculates the values of "shape and gain" in the difference vectors ↑X' based upon the difference vectors ↑X' that have been calculated by the average-value separation section 33, and outputs these values to the decoding process section 32 as signal S37 and signal S38. An explanation will be given later of "shape and gain".

Figure 6:
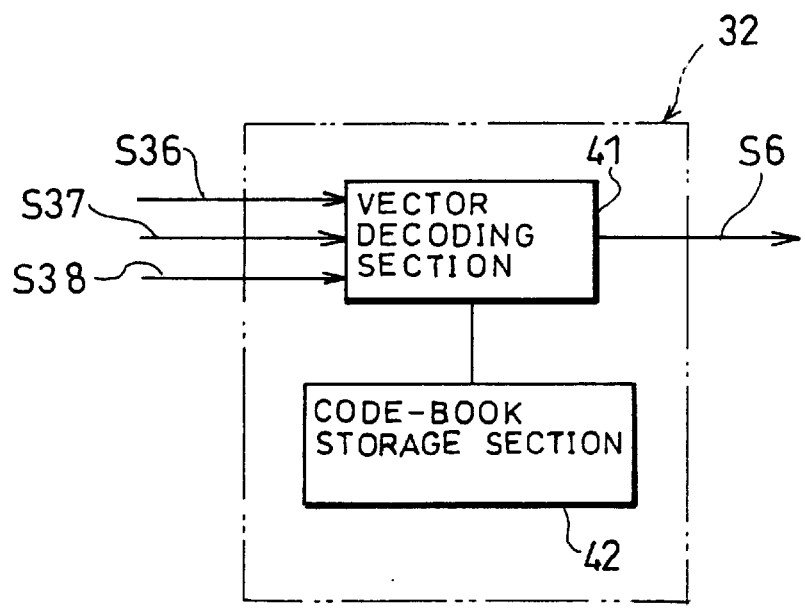
FIG. 6 is a block diagram that shows a construction of a decoding process section in the color CCD camera system shown in FIG. 4.
Figure 7:
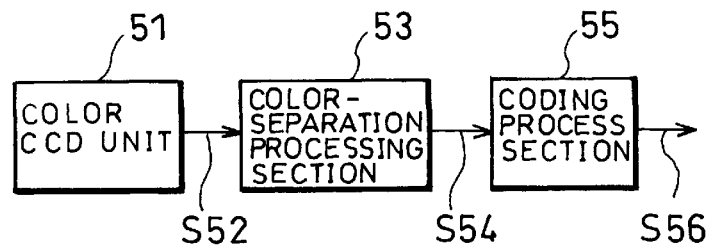
FIG. 7 is a block diagram that shows a construction of a conventional color CCD camera system.
Figure 8:
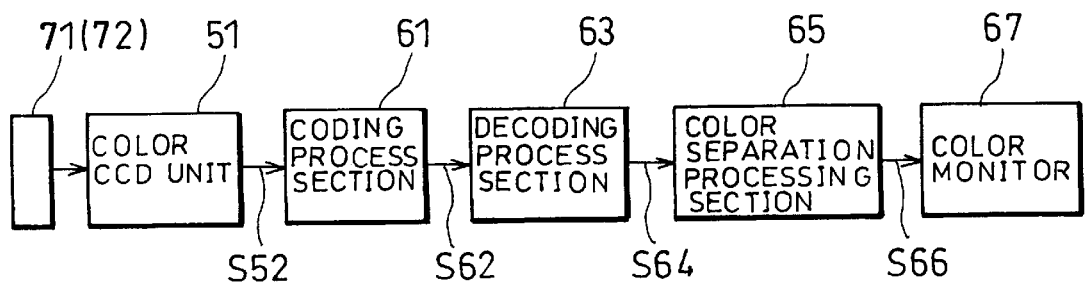
FIG. 8 is a block diagram that shows another construction of a conventional color CCD camera system.
Figure 10:
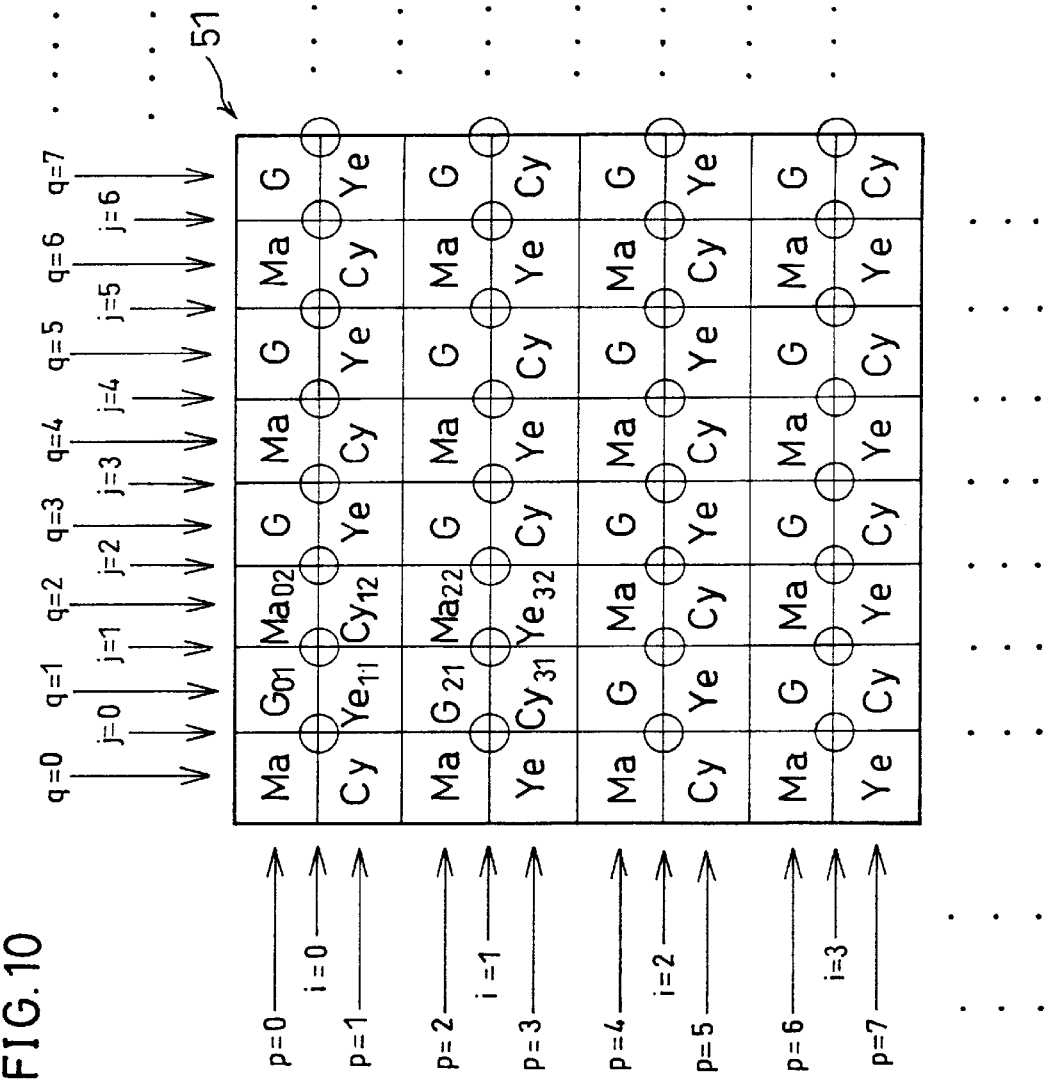
FIG. 10 is an explanatory drawing that shows pixels of a color CCD unit when the complementary-color filter shown in FIG. 9 is used in the color CCD camera system shown in FIG. 7.
Figure 12:
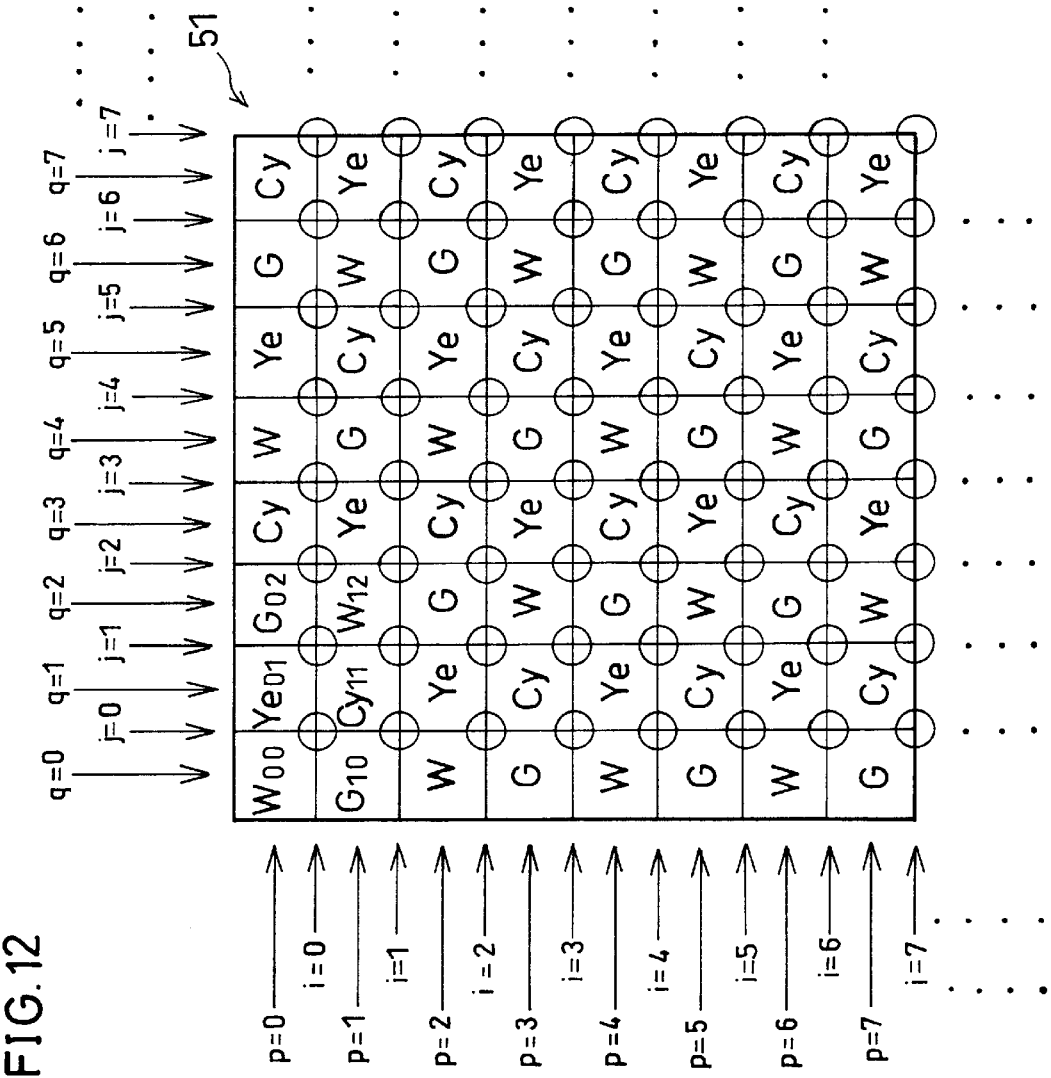
FIG. 12 is an explanatory drawing that shows pixels of a color CCD unit when the complementary-color filter shown in FIG. 11 is used in the color CCD camera system shown in FIG. 7.

FIG. 6 is a block diagram that shows the construction of the decoding process section 32. As illustrated in this Figure, the decoding process section 32 is provided with a vector decoding section (decoding means) 41 and a code-book storage section (second storage means) 42.

The vector decoding section 41 calculates the luminance signal Y and the color-difference signals U and V of each block based upon signals S36 through S38 released from the coding process section 31, that is, the five values of mean y, mean u, mean v, shape and gain, and then decodes the image information, thereby outputting it to the color monitor 7 as a reproduction signal S6.

The code-book storage section 42 is used for storing code-book vectors ↑Cay(s) consisting of a set of 64 16-dimensional vectors $(Cay(s)_k, s=0, 1, \ldots, 63, k=0, 1, 2, \ldots, 15)$. An explanation will be given later of the code-book vectors ↑Cay (s) (decompression code-book vectors).

The following description will discuss compression and decompression processes of the present camera system in which the average-value separation normalization vector quantization method of image information is used. In the same manner as the color CCD camera system described in embodiment 1, the present camera system carries out a color-separating operation on image information to be decompressed, by using the virtual color-separation method as shown by reference to the aforementioned equations 19 through 27. Therefore, it is assumed that, in the image information, one portion of AC components ((3, 1) and (3, 2) components shown in FIG. 13) and DC components of the luminance signal Y and components other than DC components of the color-difference signals U and V are set to zero.

Upon picking up an image from a subject, the color CCD unit 1 outputs the image picked up to the coding process section 31 as signals S2. The number of signals S2 per one screen is the same as the number of pixels of the color CCD unit 1, that is, 288×352 signals.

When signals S2 are inputted to the coding process section 3, the average-value separation section 33 divides these 288×352 signals S2 into blocks, each consisting of 4 longitudinal signals×4 lateral signals, that is, a total of 16 signals. Then, the average-value separation section 33 acquires vectors ↑X that represent the respective blocks, and calculates the average values mean y and mean u mean v and the difference vectors ↑X', and outputs these to the decoding process section 32 as signal S36.

The following description will discuss the way in which the average values mean y and mean u means v and the differential vectors ↑X' are calculated in the average-value separation section 33. The average-value separation section 33 is preliminarily provided with 16-dimensional vectors ↑My $(My_k, k=0, 1, 2, \ldots, 15)$, ↑Mu $(Mu_k, k=0, 1, 2, \ldots, 15)$ and ↑Mv $(Mv_k, k=0, 1, 2, \ldots, 15)$. These ↑My, ↑Mu and ↑Mv are defined by the following equation 30. In $W_{c, m=0, n=0, k}$ (c represents y, u and v) in this equation, subscripts p and q of $W_{cmnpq}$ in equation 25 are collectively represented by one factor $k=4p+q$ ($k=0, 1, 2, \ldots, 15$).

$$\begin{cases} My_k = W_{y,m=0,n=0,k} \\ Mu_k = W_{u,m=0,n=0,k} \\ Mv_k = W_{v,m=0,n=0,k} \end{cases} \quad \text{(EQUATION 30)}$$

Then, the average-value separation section 33 calculates the average values mean y and mean u mean v of the vectors ↑X' corresponding to the respective blocks by using the following equation 31, and outputs them to the coding process section 32 as signal S36. As indicated by equation 31, the average-value separation section 33 calculates the average values mean y and mean u·mean v by finding inner products between the vectors ↑X and ↑My, ↑Mu and ↑Mv. In this manner, different from the aforementioned equation 14, equation 31 calculates the sum of products between $X_k$ and $My_k$, $MU_k$ and $Mv_k$. In other words, these average values mean y, mean u mean v represent DC components in the spatial frequency components of the luminance signal Y and color-difference signals U and V.

$$\begin{cases} \text{mean } y = \sum_{k=0}^{15} X_k \cdot My_k \\ \text{mean } u = \sum_{k=0}^{15} X_k \cdot Mu_k \\ \text{mean } v = \sum_{k=0}^{15} X_k \cdot Mv_k \end{cases} \quad \text{(EQUATION 31)}$$

Moreover, the average-value separation section 33 is preliminarily provided with 16-dimensional vectors consisting of ↑Vy ($Vy_k$, k=0, 1, 2, ..., 15), ↑Vu ($Vu_k$, k=0, 1, 2, ..., 15) and ↑Vv ($Vv_k$, k=0, 1, 2, ..., 15). These ↑Vy, ↑Vu and ↑Vv are defined by the following equation 32. Further, the average-value separation section 33 calculates the difference vectors ↑X' corresponding to the respective blocks by using the following equation 33.

$$\begin{cases} Vy_k = W^{-1}_{ky,m=0,n=0} \\ Vu_k = W^{-1}_{ku,m=0,n=0} \\ Vv_k = W^{-1}_{kv,m=0,n=0} \end{cases} \quad \text{(EQUATION 32)}$$

$$X'_k = X_k - \text{mean } y \cdot Vy_k - \text{mean } u \cdot Vu_k - \text{mean } v \cdot Vv_k \quad \text{(EQUATION 33)}$$

As described above, in the present camera system, first, DC components in the spatial frequency components of the luminance signal Y and the color-difference signals U·V are calculated from the vectors ↑X by using equation 31 based upon the virtual color-separation method as shown by equations 19 through 25. Further, by using ↑Vy, ↑Vu and ↑Vv shown in equation 32, the DC components thus obtained are subjected to transformation in the real space, and then subtracted from the vectors ↑X; thus, the difference vectors ↑X' are acquired. Therefore, upon transformation by the virtual color-separation method, the difference vectors ↑X', which are obtained by equation 33, come to have values only in 13 components except for (3, 1) and (3, 2) components shown in FIG. 13 in the AC components of the luminance signal Y.

Moreover, the above-mentioned calculations of the mean values mean y and mean u·mean v and the difference vectors ↑X can also be expressed as follows: Assuming that in the frequency space transformed by the virtual color-separation method, the regular orthogonal basic vectors of the luminance signal Y and the color-difference signals U·V in the DC direction are respectively ↑$My_0$, ↑$Mu_0$ and ↑$Mv_0$, the values of DC components of the luminance signal Y and the color-difference signals U·V of the vectors ↑X are given by the following equation 34. Further, it is also represented by the following equation 35: In these equations, [W] is obtained by representing the above-mentioned $W_{cmnk}$ not in component nomination, but in matrix nomination, and $^t$[W] is an inverted matrix of [W]. Here, in these equations, terms such as (↑A, ↑B) represent the inner product of ↑A and ↑B.

$$\begin{cases} ([W] \uparrow X, \uparrow My_0) = \sum_{k=0}^{15} ([W] \uparrow X)_k \cdot My_{0k} \\ ([W] \uparrow X, \uparrow Mu_0) = \sum_{k=0}^{15} ([W] \uparrow X)_k \cdot Mu_{0k} \\ ([W] \uparrow X, \uparrow Mv_0) = \sum_{k=0}^{15} ([W] \uparrow X)_k \cdot Mv_{0k} \end{cases} \quad \text{(EQUATION 34)}$$

$$\begin{cases} (\uparrow X, {}^t[W] \uparrow My_0) = \sum_{k=0}^{15} X_k \cdot ({}^t[W] \uparrow My_0)_k \\ (\uparrow X, {}^t[W] \uparrow Mu_0) = \sum_{k=0}^{15} X_k \cdot ({}^t[W] \uparrow Mu_0)_k \\ (\uparrow X, {}^t[W] \uparrow Mv_0) = \sum_{k=0}^{15} X_k \cdot ({}^t[W] \uparrow Mv_0)_k \end{cases} \quad \text{(EQUATION 35)}$$

Here, $^t$[W] ↑$My_0$ is equivalent to ↑My. In the same manner, $^t$[W] ↑$Mu_0$ and $^t$[W] ↑$Mv_0$ are equivalent to ↑Mu and ↑Mv respectively. Therefore, the above-mentioned mean y and mean u·mean v are regarded as DC components of the luminance signal Y and the color-difference signals U·V respectively. Similarly, ↑Vy, ↑Vu and ↑Vv are represented by [W]$^{-1}$↑$My_0$, [W]$^{-1}$↑$Mu_0$ and [W]$^{-1}$↑$Mv_0$ respectively. Substitution of equation 33 with these yields the following equation 36:

$$\uparrow X' = \uparrow X - (\uparrow X, {}^t[W] \uparrow My_0)[W]^{-1} \uparrow My_0 - \quad \text{(EQUATION 36)}$$
$$(\uparrow X, {}^t[W] \uparrow Mu_0)[W]^{-1} \uparrow Mu_0 -$$
$$(\uparrow X, {}^t[W] \uparrow Mv_0)[W]^{-1} \uparrow Mv_0$$

When difference vectors ↑X' obtained by the above equation are transformed to the frequency space by using W through the virtual color-difference method and the DC component of the luminance signal Y of the difference vectors ↑X' is calculated, the following equation 37 becomes zero. In the same manner, when the DC components of the color-separation signals U·V of the difference vectors ↑X' calculated, it also becomes zero. Therefore, when transformed into the frequency space by using the virtual color-separation method, the difference vectors ↑X' are allowed to have only the values of AC components of the luminance signal Y.

$$([W] \uparrow X', \uparrow My_0) = ([W] \uparrow X, \uparrow My_0) - \quad \text{(EQUATION 37)}$$
$$([W]\{(\uparrow X, {}^t[W] \uparrow My_0)$$
$$[W]^{-1} \uparrow My_0\}, \uparrow My_0) -$$

-continued $$([W]\{(\uparrow X, {}^t[W] \uparrow Mu_0)$$
$$[W]^{-1} \uparrow Mu_0\}, \uparrow My_0) -$$
$$([W]\{(\uparrow X, {}^t[W] \uparrow Mv_0)$$
$$[W]^{-1} \uparrow Mv_0\}, \uparrow My_0)$$
$$= ([W]\uparrow X, \uparrow My_0) - ((\uparrow X,$$
$${}^t[W] \uparrow My_0)[W][W]^{-1} \uparrow My_0, \uparrow My_0)$$
$$= \text{mean } y - \text{mean } y = 0$$

As described above, after the average-value separation section 33 has calculated the average values mean y and means u·v and the difference vectors ↑X', the vector quantization section 35 calculates "shape" and "gain" from the difference vectors ↑X' and difference code-book vectors ↑C'(s) stored in the code-book storage section 34, and outputs them to the decoding process section 32 as signal S37 and signal S38.

Next, the following description will discuss calculations of "shape" and "gain" in the vector quantization section 35. First, an explanation will be given of the difference code-book vector ↑C'(s) stored in the code-book storage section 34.

When signal S2 derived from images that have been picked up from various subjects by the color CCD unit 1 is inputted to the coding process section 31, the average-value separation section 33 divides signal S2 into blocks, thereby making a plurality of 16-dimensional vectors ↑X. For example, in the case of 1000 images from various subjects, vectors ↑X the number of which is 72×88×1000 are obtained.

Thereafter, the average-value separation section 33 subjects the vectors ↑X to an average-value separating process by using the above-mentioned ↑My, ↑Mu, ↑Mv, ↑Vy, ↑Vu and ↑Vv based upon equations 31 and 33, thereby forming the difference vectors ↑X'. Successively, it subjects the difference vectors ↑X' to a standardizing process so as to have the size 1, and applies the aforementioned LBG algorithm method to the standardized difference vectors ↑X', thereby forming representative vectors. These representative vectors serve as the difference code-book vectors ↑C'(s) that are to be stored in the code-book storage section 34.

The vector quantization section 35 calculates the inner product between the difference code-book vectors ↑C'(s) and the difference vectors ↑X' of the respective blocks that have been found by the average-value separation section 33 by using the following equation 38. Thus, the number of the difference code-book vector ↑C'(S) that allows the inner value in association with the differential vectors ↑X' of the respective blocks to have a maximum value is defined as "shape" in the corresponding block, and the maximum inner value is defined as "gain".

$$gain = \max_s \left( \sum_{k=0}^{15} X'_k \cdot C'(s)_k \right) \qquad \text{(EQUATION 38)}$$

Signal S36 from the average-value separation section 33 in the coding process section 31 and signals S37 and S38 from the vector quantization section 35 therein are inputted to the vector decoding section 41 in the decoding process section 32. The vector decoding section 41 decodes the luminance signal Y and the color-difference signals U·V in accordance with signals S36 through S38. The following description will discuss decoding processes that are carried out on the luminance signal Y and the color-difference signals U·V in the coding process section 32.

The vector decoding section 41 of the decoding process section 32 is preliminarily provided with 16-dimensional vectors consisting of ↑Cy (Cy$_k$, k=0, 1, 2, . . . , 15), ↑Cu (Cu$_k$, k=0, 1, 2, . . . , 15) and ↑Cv (Cv$_k$, k=0, 1, 2, 15). These ↑Cy, ↑Cu and ↑Cv are defined by the following equation 39. As shown in equation 39, the components of ↑Cy, ↑Cu and ↑Cv are all set at 0.125. Then, the coding process section 32 carries out calculations using ↑Cu and ↑Cv of them based upon the following equation 40. In equation 40, the color-difference signals U and V are represented by vectors having components derived from outputs of pixels of each block.

$$Cy_k = Cu_k = Cv_k = F^{-1}{}_{k,\,m=0,\,n=0} = 0.125 \qquad \text{(EQUATION 39)}$$

$$U_k = \text{mean } u \cdot Cu_k V_k = \text{mean } v \cdot Cv_k \qquad \text{(EQUATION 40)}$$

Next, the vector decoding section 41 selects number s (=shape) code-book vector, ↑Cay (S), from code-book vectors ↑Cay(s) stored in the code-book storage section 42. These code-book vectors ↑Cay(s) have been preliminarily formed by using the difference code-book vectors ↑C'(s) based upon the following equation 41 and stored in the code-book storage section 42.

In this equation, W$_{ymn1}$ is obtained by collectively combining p and q in W$_{cmnpq}$ into 1 with 1=4p+q and assuming that c=y. Moreover, $F^{-1}{}_{kmn}$ is obtained by collectively combining i and j in an inverse matrix $F^{-1}{}_{ijmn}$ of the discrete cosine transform matrix F$_{mnij}$ shown in equation 20 into one term with k=4i+j. Further, in this equation, with respect to m and n, addition of only AC components of the luminance signal Y is taken. Therefore, these code-book vectors ↑Cay (s) serve as code-book vectors for decoding only AC components of the luminance signal Y obtained by the virtual color-separation method.

The vector decoding section 41 calculates the luminance signal Y by using the code-book vectors ↑Cay(s), mean y and gain based upon the following equation 42. In equation 42, the luminance signal Y is represented as vectors in the same manner as the color-difference signals U and V in equation 40.

$$Cay(s)_k = \left( \sum_{m,n,1} F^{-1}_{k,m,n} \cdot W_{ymn1} \cdot C'(s)_1 \right) \qquad \text{(EQUATION 41)}$$

(where m, n is addition of only AC components (13 components) of Y)

$$Y_k = \text{mean } y \cdot Cy_k + \text{gain} \cdot Cay(S)_k \qquad \text{(EQUATION 42)}$$

The vector decoding section 41 carries out decompression processes of the luminance signal Y and the color-difference signals U·V on all the 72×88 (=(288/4)×(352/4)) blocks that constitute one image information, thereby reconstructing the image information and outputting it to the color monitor 7 as reproducing signal S6.

As described above, in the present camera system, the average-value separation section 33 separates the average values of the luminance signal Y and the color-difference signals U·V, that is, DC components, from the vectors ↑X so that the difference vectors ↑X' are generated. Therefore, when the difference vectors ↑X' are transformed into the frequency space by the virtual color-separation method, only the AC components of the luminance signal Y are allowed to have values.

Moreover, in the vector quantization section 35, compression is only applied to the difference vectors ↑X' by means of the vector quantization, while no compression is applied to the DC components of the luminance signal Y and the color-difference signals U·V, and these are outputted to the coding process section 32. For this reason, only the AC components of the luminance signal Y are subjected to errors caused by the vector quantization, while the color-difference signals U·V are not subjected to errors caused by the vector quantization. Therefore, as compared with the case in which all components of the luminance signal Y and the color-difference signals U·V are subjected to the compression and decompression, it becomes possible to obtain a reproducing signal S6 having less false colors.

Additionally, in the case when, after the output signal S2, released from the color CCD unit having the complementary-color filter 2 as shown in FIG. 11, has been subjected to the compression and decompression by the vector quantization method, it is further subjected to the color-separation process, the resulting luminance signal Y and color-difference signals U·V are offset from those signals obtained by the color-separation process without having been subjected to the compression and decompression. Since human vision is sensitive to the luminance signal Y, it is preferable to reproduce the luminance signal Y more faithfully than the color-difference signals U·V; however, in this case, the offset occurs in both the luminance signal Y and the color-difference signals U·V in the same manner.

Therefore, in the present camera system, in order to minimize the offset in the luminance signal Y, the average-value separation, that is, the color separation process, is carried out on the signal S2 by the average-value separation section 33 prior to carrying out the compression process. This is the same as the case in which separate compression processes are carried out on the luminance signal Y and the color-difference signals U·V respectively. Moreover, the vector quantization section 35 carries out compression on the difference vectors ↑X' by means of the vector quantization, and also carries out decompression at the vector decoding section 41. These are compression and decompression for the AC components of the luminance signal Y; thus, it becomes possible to reproduce the luminance signal Y with less errors than the color-difference signals U and V.

Moreover, the average-value separation of the average-value separation section 33, that is, the color-separation process, is carried out only on the DC components of the luminance signal Y and the color-difference signals U·V. Therefore, different from a conventional color CCD camera system which carries out the color-separation process of input signals based upon 4-pixel addition and 4-pixel difference, it is possible to reduce the amount of processes for color separation. Consequently, the circuit scale of the average-value separation section 33 can be minimized to a great degree as compared with the conventional color-separation circuit. Thus, the present camera system achieves a small-size color CCD camera system having a small circuit scale at low production costs.

Additionally, the average-value separation process by the average-value separation section 33 may be carried out as follows: [W] is applied to the vectors ↑X so that the DC components of the luminance signal Y and the color-difference signals U·V are acquired, and compression is applied to the rest of the components by means of the quantization. These processes are based on the following equations 43 and 44.

mean $y$=([W]↑X, ↑My$_0$) mean $u$=([W]↑X, ↑Mu$_0$) mean $v$=([W]↑X, ↑Mv$_0$)　　(EQUATION 43)

↑X"=[W]↑X−mean $y$·↑My$_0$−mean $u$·↑Mu$_0$−mean $v$·↑Mv$_0$　　(EQUATION 44)

In this case, ↑X" are vectors limited to a space including only the AC components of the luminance signal Y in the frequency space. Therefore, it is possible to carry out the regular vector quantization in this space. However, it seems to be difficult to carry out the operation [W]↑X in an analog circuit from the viewpoint of precision. In other words, the operation [W]↑X must be carried out with higher precision than other operations. Thus, in the present embodiment, as described in equation 41, the transformation using [W] is incorporated into the code-book vector ↑Cay(s) stored in the code-book storage section 42. Since the operations in the vector decoding section 41 can be digital-decompressed on a software basis, the precision can be increased. Here, although coefficients of [W] having respective 16 components are also included in ↑Mc and ↑Vc (c represents y, u and v), high precision is not required for the operations using ↑Mc and ↑Vc.

In the present embodiment, image information acquired by the color CCD unit 1 is divided into 4×4 blocks each of which is subjected to a color-separation process by the virtual color-separation method. Then, compression by means of the vector quantization is carried out only on the AC components of the luminance signal Y; however, the present invention is not intended to be limited thereby. For example, in order to ensure high quality of images that are decompressed in the decoding process section 32, components that are to be outputted from the coding process section 31 to the decoding process section 32 without compression may be increased. In other words, in addition to the above-mentioned average values, means y and mean u·mean v, part of the AC components of the luminance signal Y may be outputted to the decoding process section 32 without compression, and the rest of the AC components of the luminance signal Y may be compressed and outputted; thus, it becomes possible to further reduce errors due to the compression and decompression.

Moreover, one block may be designed to have, for example, 8×8 pixels (number of signals). In this case also, as in the case of 4×4 shown in Embodiment 1, it is necessary to select components that are to be set to zero in the spatial frequency components so as to allow $Z_{pqcmn}$ in equation 23 to have an inverse matrix and to enhance the quality of reproduced images as high as possible.

Here, image information that is to be compressed and decompressed by means of the vector quantization may include not only the AC components of the luminance signal Y, but also AC components of the color-difference signals U·V, depending on the selection of components that are to be set to zero. In this case, signals to be subjected to compression and decompression processes are AC components of the luminance signal Y and the color-difference signals U·V.

In such a case, it is necessary to store in the code-book storage section 42 of the decoding process section 32 decompression code-book vectors that correspond to the code-book vectors ↑Cay(s), such as code-book vectors ↑Cy(s), ↑Cu(s) and ↑Cv(s) shown in Embodiment 1, for the respective signals. Then, a plurality of kinds of decompression code-book vectors for decompressing the AC components of the respective signals are provided for each of the difference code-book vectors ↑C'(s); thus, it becomes possible to carry out the color-separation process properly upon decompression in the decoding process section 32. In this case, the number of components being not zero which are obtained by transforming the difference code-book vectors ↑C'(s) to the frequency space by the virtual color-separation method is equal to the number of components being not zero which are obtained by transforming all the decompression code-book vectors to the frequency space by the frequency transform.

In this case also, the difference code-book vectors ↑C'(s) may be provided for each of the signals. Here, the number of the difference code-book vectors ↑C'(s) is equal to the number of the decompression code-book vectors.

Additionally, the above-mentioned virtual color-separation method is not used only for forming the decompression code-book vectors in the vector quantization. Moreover, the color-separation process in this method may be carried out as follows: In the color-separation processing method where color image information consisting of a plurality of pixel signals is acquired by picking up images, the color image information is divided into a plurality of blocks each having a predetermined number of pixel signals, and the color image information is separated to a luminance signal and color-difference signals, the spatial frequency components of these luminance signal and color-difference signals are formed by setting components obtained by linearly transforming vectors whose components are the output values of the pixel signals of each block as predetermined components in the spatial frequency components of the luminance signal and color-difference signals of this block with the other components of the spatial frequency components being set to zero, and the luminance signal and color-separation signals in each block are generated by transforming the resulting spatial frequency components of the luminance signal and color-separation signals to the real space. In this case, the number of the predetermined components is equal to the number of pixel block in each block.

Furthermore, in the present embodiment, the AC components of the luminance signal are selected as components that are to be compressed in image information and the DC components of the luminance and color-separation signals are selected as components that are not to be compressed therein; however, the present invention is not intended to be limited by this arrangement. It is possible for the user to select any desired components of image information; for example, components, such as those not taking up much amount of information without the need for compression, may be selected. Further, with respect to the components to be compressed, for example, those components that are not subject to degradation in quality of image information even after decompression may be selected.

Additionally, the color CCD camera system as shown in Embodiment 1 and Embodiment 2 may be applied to, for example, digital cameras that store data after decompression in a built-in memory, portable electronic information terminals provided with a display on which data after compression is displayed, monitoring systems which transmit data after compression to the main body (monitor) side by wire or radio and decompress the data at the main body side so as to display, or cameras used at television conferences, etc.

Moreover, programs for carrying out all or part of processes in the decoding process section 5 and the decoding process section 32 may be recorded in a recording medium such as a CD-ROM (Read Only Memory) and a FD (Floppy Disk), and an image processing apparatus capable of reading these programs may be used instead of the decoding process section 5 or the decoding process section 32.

Furthermore, programs for carrying out all or part of processes in the coding process section 3 and the coding process section 31 may be recorded in a recording medium such as a CD-ROM (Read Only Memory) and a FD (Floppy Disk), and a digital camera capable of reading these programs may be used instead of the coding process section 3 or the coding process section 31.

The color CCD camera system of the present invention may be provided with an arrangement in which the plural kinds of decompression code-book vectors, stored in the second storage means, are obtained by subjecting code-book vectors to a color-separation process.

In the above-mentioned arrangement, the decompression code-book vectors, stored in the second storage means, are vectors obtained by subjecting code-book vectors to a color-separation process, that is, those consisting of the luminance components and color-difference components of the code-book vectors. Therefore, image information obtained by decompression in the decoding means is constituted by the luminance signal and color-separation signals in color image information. For this reason, it is not necessary to install a color-separation processing circuit for separating image information obtained by picking up images to a luminance signal and color-separation signals. Thus, it becomes possible to carry out color-separation without causing an increase in the circuit scale and high production costs.

Moreover, the color CCD camera system of the present invention may be provided with an arrangement wherein: the decompression code-book vectors, stored in the second storage means, are constituted by luminance code-book vectors for forming a luminance signal and color-difference code-book vectors for forming color-difference code-book vectors, the luminance and color-difference code-book vectors have the same dimension as code-book vectors stored in the first storage means, and predetermined components in the spatial frequency components of these luminance and color-difference code-book vectors are obtained by transforming the code-book vectors, with the rest of components being set to zero.

The above-mentioned arrangement is used for carrying out a color-separation process properly. In the arrangement, the decompression code-book vectors are constituted by luminance code-book vectors and color-difference code-book vectors that are used for forming a luminance signal and color-difference signals from code-book vectors that the decoding means have selected from the storage means. Here, these luminance and color-difference code-book vectors have the same dimension as the code-book vectors, and are preliminarily formed by using these code-book vectors.

In the case when, upon formation, for example, one kind of luminance code-book vectors and two kinds of color-difference code-book vectors are formed, the number of all these components is three times the number of components of the code-book vectors. Therefore, all independent components of the luminance and color-difference code-book vectors can not be made from one code-book vector.

Therefore, in the above-mentioned arrangement, upon forming the luminance and color-difference code book vectors, the spatial frequency components of the luminance and color-difference code-book vectors are formed. In this case, only predetermined components of the spatial frequency components are formed by subjecting the code-book vectors to a linear transformation, etc., with the rest of the components being set at zero. Here, the number of the predetermined components is equal to the number of components of the code-book vectors. Then, the resulting spatial frequency components are transformed to the real space so that the luminance and color-difference code-book vectors are formed.

With this arrangement, it becomes possible to form a plurality of kinds of decompression code-book vectors, that is, the luminance and color-difference code-book vectors, from one code-book vector. Thus, sets of luminance signals and color-difference signals are acquired from pixel signals that have inputted to each block, with each set having the same number as the number of the pixel signals. Therefore, image information that has been subjected to the color-separation process is properly acquired from the luminance code-book vectors and color-difference code-book vectors that correspond to the code-book vectors. Consequently, it is not necessary to install a color-separation processing circuit for separating image information obtained by picking up images into a luminance signal and color-separation signals. Thus, it becomes possible to carry out color-separation as well as compression and decompression by means of the vector quantization, without causing an increase in the circuit scale and high production costs.

With respect to the components that are to be set to zero in the spatial frequency components, it is preferable to select those components that are hardly perceived by the human visual sense. For example, high-frequency components in color image information are less recognizable for humans than low-frequency components, and AC components in color-difference signals are also less recognizable than AC components of a luminance signal. Therefore, by selecting, for example, all the AC components of color-difference signals and high-frequency AC components of a luminance signal, it becomes possible to improve the quality of color image information that is reproduced by the decoding means.

Moreover, the color CCD camera system of the present invention may be provided with: a CCD section for acquiring color image information consisting of a plurality of pixel signals by picking up an image; a first storage section for preliminarily storing a plurality of code-book vectors as quantization representative vectors; a coding section which divides the color image information into a plurality of blocks with each block containing a predetermined number of pixel signals, separates vectors corresponding to each block into a first portion that is compressed and a second portion that is not compressed, and outputs the second portion as a first compression signal corresponding to each block, while selecting code-book vectors corresponding to the first portion from the first storage means and outputting information for identifying the selected code-book vectors as a second compression signal corresponding to each block; a second storage section for preliminarily storing at least one kind of decompression code-book vectors corresponding to the respective code-book vectors; and a decoding means which specifies a code-book vector corresponding to each block based upon the second compression signal, selects decompression code-book vectors corresponding to the code-book vector from the second storage means, and decompresses and acquires the first portion corresponding to each block for each of the selected decompression code-book vectors, while acquiring the second portion corresponding each block from the first compression signal, so that the color image information is reconstructed by decoding the pixel signals constituting each block from the first and second portions that have been acquired.

With the above-mentioned arrangement, the color image information consisting of pixel signals derived from a plurality of pixels is divided into blocks each having a predetermined number of pixel signals, and each block is transformed into vectors. This transformation into vectors is carried out, for example, by transforming each block into the vectors having a predetermined number of dimensions by using the output values of the pixel signals as components thereof.

The coding means separates vectors corresponding to each block into a first portion that is compressed and a second portion that is not compressed. Then, the coding means outputs the second portion to the decoding means as a first compression signal corresponding to each block. Here, the first storage means preliminarily stores a plurality of code-book vectors. The plural code-book vectors are vectors different from each other, each having the same number of dimensions as the first portion of vectors corresponding to each block.

The coding means selects those code-book vectors corresponding to the first portion among the code-book vectors. This operation is carried out by using a method desired by the user, such as, for example, selecting those that are most similar to the first portion. Further, it outputs information containing information for identifying the selected code-book vectors that are required for decoding to the decoding means as the second compression signal.

The second storage means preliminarily stores a single kind of or a plurality of kinds of decompression code-book vectors corresponding to the respective code-book vectors. These decompression code-book vectors are used for decoding the first block of each block.

The decoding means identifies code-book vectors corresponding to the first portion in the vectors of each block from information for identifying code-book vectors that are compressed color image information. Then, it selects those decompression code-book vectors corresponding to the respective code-book vectors from the second storage means so that a piece of image information is decoded for each of the kinds of the decompression code-book vectors. Therefore, pieces of image information the number of which is the same as that of the kinds of the decompression code-book vectors are obtained as the image corresponding to the first portion.

The decompression code-book vectors are determined by the kinds of color image information that the user desires. For example, if an attempt is made so that one piece of color image information is decompressed with its colors being separated, each code-book vector is preliminarily subjected a color-separation process so that the luminance component and the color-difference components are separated, and the respective components are provided as two kinds of decompression code-book vectors corresponding to each code-book vector. In this case, the second portion has to be color-separated prior to formation of the pixel signals by the decoding means.

Therefore, signal-separation processes, such as, for example, a color-separation process, which are to be carried out after decompression of color image information, are preliminarily applied to these code-book vectors, and a plurality of kinds of vectors that are to be obtained after the process are stored in the second storage means as the decompression code-book vectors; thus, it becomes possible to eliminate the necessity of a processing circuit for signal separation of the first portion. Consequently, in the color CCD camera system of the present invention, the circuit for signal separation is provided only for the second portion that is not to be compressed. Therefore, the present invention makes it possible to provide a color CCD camera system capable of carrying out a desired signal-separation process without the necessity for a large circuit scale and without causing high production costs.

Moreover, the color CCD camera system of the present invention may be arranged as follows: the second portion is constituted by predetermined components in the spatial frequency components of the luminance signal and color-separation signals that are obtained by linearly transforming vectors corresponding to each block, the first portion consists of components obtained by subtracting those components obtained by transforming the second portion to the real space from the vectors corresponding to each block, the decompression code-book vectors are constituted by at least either the luminance code-book vectors for generating a luminance signal or the color-difference code-book vectors for generating color-difference signals, and predetermined components in the spatial frequency components of the luminance and color-difference code-book vectors are obtained by linearly transforming the code-book vectors while the other components are set to zero.

The above-mentioned arrangement is intended to carry out a color-separation process properly. As described earlier, it is not possible to form all independent components of the luminance and color-difference code-book vectors from one code-book vector. Therefore, in this arrangement also, upon forming the luminance and color-difference code-book vectors, the spatial frequency components of the luminance and color-difference code-book vectors are first formed. In this case, only predetermined components of the spatial frequency components are formed by subjecting the code-book vectors to linear transformation, etc., while the rest of the components is set to zero. Here, the number of the predetermined components is determined so that the sum between it and the number of spatial frequency components of the vectors corresponding to each block that are outputted as the second portion is equal to the number of the pixel signals in each block.

In the above-mentioned arrangement, since there are spatial frequency components of the luminance signal and color-difference signals which are outputted as the second portion without being subjected to compression and decompression, the number of the predetermined components in the spatial frequency components of the luminance and color-difference code-book vectors is obtained by subtracting the number of components outputted as the second portion from the number of components of the code-book vectors. Then, the resulting spatial frequency components are transformed to the real space so that the luminance and color-difference code-book vectors are formed. In this manner, it becomes possible to form a plurality of kinds of decompression code-book vectors for decompressing the first portion, that is, the luminance and color-difference code-book vectors, from one code-book vector.

The decoding means forms the luminance signal and color-difference signals from the luminance and color-difference code-book vectors and those components obtained by transforming the second portion that has been outputted without compression into the real space. Here, the number of each signal is equal to the number of pixel signals inputted to each block. Consequently, it is not necessary to install a circuit for separating the first portion a luminance signal and color-separation signals. Therefore, it becomes possible to carry out color-separation as well as compression and decompression by means of the vector quantization, without causing an increase in the circuit scale and high production costs.

In this case, neither compression nor decompression is applied to the predetermined components of the spatial frequency components of the luminance signal and color-difference signals that have been outputted as the second portion; therefore, as compared with the case in which all components of the luminance signal and the color-difference signals are subjected to the compression and decompression, it is possible to reduce the amounts of compression and decompression. Thus, it becomes possible to make the reconstructed image less susceptible to false colors.

Moreover, for example, in the case when the DC components of the luminance signal and color-difference signals are selected as the second portion and one part of the AC components of the luminance signal is selected as the first portion, the decompression code-book vectors consist of only the luminance code-book vectors. This arrangement makes it possible to precisely reproduce the luminance signal that is more easily recognizable, thereby providing image information with higher quality.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A color solid-state image-pickup camera system comprising:

image pickup means for acquiring color image information consisting of a plurality of pixel signals by picking up an image;

first storage means for preliminarily storing a plurality of code-book vectors as quantization representative vectors;

coding means which divides the color image information into a plurality of blocks with each block containing a predetermined number of pixel signals, selects a code-book vector corresponding to each block among the plurality of code-book vectors stored in the first storage means upon carrying out vector quantization, and outputs information for specifying the selected code-book vector as a compression signal corresponding to each block;

second storage means for preliminarily storing a plurality of kinds of decompression code-book vectors corresponding to the respective code-book vectors; and decoding means which specifies a code-book vector corresponding to each block based upon the compression signal, selects the plurality of kinds of decompression code-book vectors corresponding to the code-book vector from the second storage means, and reconstructs the color image information by decoding pixel signals constituting each block for each of the kinds of the decompression code-book vectors that have been selected.

2. The color solid-state image-pickup camera system as defined in claim 1, wherein said plurality of kinds of decompression code-book vectors are obtained by applying a color-separation process to the code-book vectors.

3. The color solid-state image-pickup camera system as defined in claim 1, wherein said plurality of kinds of decompression code-book vectors corresponding to the code-book vectors, which are selected from the second storage means by the decoding means, are constituted by luminance code-book vectors for forming a luminance signal and color-difference code-book vectors for forming color-difference code-book signals.

4. The color solid-state image-pickup camera system as defined in claim 3, wherein: said luminance and color-difference code-book vectors have the same dimension as the code-book vectors, and predetermined components in spatial frequency components of the luminance and color-difference code-book vectors are obtained by transforming the code-book vectors, while other components thereof are set to zero.

5. The color solid-state image-pickup camera system as defined in claim 4, wherein said other components, set to zero in the spatial frequency components, are components that are difficult to be perceived by human visual sense.

6. The color solid-state image-pickup camera system as defined in claim 4, wherein: among the plurality of blocks obtained by dividing the color image information, adjacent blocks are not allowed to share the same pixel signal, and the number of components of the code-book vectors stored in the first storage means is set to be equal to the number of components of the decompression code-book vectors stored in the second storage means.

7. A color solid-state image-pickup camera system comprising:

image pickup means for acquiring color image information consisting of a plurality of pixel signals by picking up an image;

first storage means for preliminarily storing a plurality of code-book vectors as quantization representative vectors;

coding means which divides the color image information into a plurality of blocks with each block containing a predetermined number of pixel signals, separates vectors corresponding to each block into a first portion that is compressed and a second portion that is not compressed, and outputs the second portion as a first compression signal corresponding to each block, while selecting code-book vectors corresponding to the first portion from the first storage means and outputting information for identifying the selected code-book vectors as a second compression signal corresponding to each block;

second storage means for preliminarily storing at least one kind of decompression code-book vectors corresponding to the respective code-book vectors; and decoding means which specifies a code-book vector corresponding to each block based upon the second compression signal, selects decompression code-book vectors corresponding to the code-book vector from the second storage means, and decompresses and acquires the first portion corresponding to each block for each of the selected decompression code-book vectors, while acquiring the second portion corresponding each block from the first compression signal, so that the color image information is reconstructed by decoding the pixel signals constituting each block from the first and second portions that have been acquired.

8. The color solid-state image-pickup camera system as defined in claim 7, wherein: said second portion is constituted by predetermined components in the spatial frequency components of the luminance signal and color-separation signals that are obtained by linearly transforming vectors corresponding to each block, the first portion consists of components obtained by subtracting those components obtained by transforming the second portion to the real space from the vectors corresponding to each block, the decompression code-book vectors are constituted by at least either the luminance code-book vectors for generating a luminance signal or the color-difference code-book vectors for generating color-difference signals, and predetermined components in the spatial frequency components of the luminance and color-difference code-book vectors are obtained by linearly transforming the code-book vectors while the other components are set to zero.

9. The color solid-state image-pickup camera system as defined in claim 8, wherein said second portion is constituted by DC components in the spatial frequency components of the luminance signal and color-difference signals and said first portion is constituted by AC components of the luminance signal.

10. The color solid-state image-pickup camera system as defined in claim 9, wherein said coding means is provided with an average-value separation section which separates and acquires DC components in the spatial frequency components of the luminance signal and color-difference signals from the vectors corresponding to the respective blocks, that is, the average value of the luminance signal and the color-difference signals, as the second portion.

* * * * *